(12) United States Patent
Kobori

(10) Patent No.: US 8,472,403 B2
(45) Date of Patent: Jun. 25, 2013

(54) MOBILE COMMUNICATION SYSTEM, RADIO BASE STATION APPARATUS AND HARD HANDOVER PROCESSING METHOD

(75) Inventor: Satoshi Kobori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 397 days.

(21) Appl. No.: 12/780,227

(22) Filed: May 14, 2010

(65) Prior Publication Data
US 2010/0296485 A1 Nov. 25, 2010

(30) Foreign Application Priority Data

May 21, 2009 (JP) ................................. 2009-122680

(51) Int. Cl.
*H04W 4/00* (2009.01)

(52) U.S. Cl.
USPC ........... 370/331; 370/328; 370/329; 370/332; 455/41.2; 455/436; 455/443

(58) Field of Classification Search
USPC ................. 370/328, 329, 331, 332; 455/41.2, 455/436–438, 443
See application file for complete search history.

(56) References Cited

U.S. PATENT DOCUMENTS

| | | | | |
|---|---|---|---|---|
| 5,140,627 | A * | 8/1992 | Dahlin | 455/436 |
| 6,205,120 | B1 * | 3/2001 | Packer et al. | 370/235 |
| 6,359,901 | B1 * | 3/2002 | Todd et al. | 370/465 |
| 6,519,748 | B2 * | 2/2003 | Sakamoto | 716/113 |
| 6,778,830 | B1 * | 8/2004 | Oizumi et al. | 455/436 |
| 7,245,656 | B2 * | 7/2007 | Kalhan | 375/220 |
| 2004/0053614 | A1 * | 3/2004 | Il-Gyu et al. | 455/436 |
| 2004/0057396 | A1 | 3/2004 | Hokao | |
| 2006/0116075 | A1 * | 6/2006 | Gallo | 455/41.2 |
| 2006/0120325 | A1 | 6/2006 | Tanabe | |
| 2007/0263528 | A1 * | 11/2007 | Mukherjee | 370/208 |
| 2008/0291866 | A1 | 11/2008 | Fukui | |
| 2009/0080451 | A1 * | 3/2009 | Gogic | 370/412 |
| 2009/0170515 | A1 * | 7/2009 | Kato et al. | 455/436 |
| 2009/0304007 | A1 * | 12/2009 | Tanaka et al. | 370/395.53 |
| 2010/0158050 | A1 * | 6/2010 | Yang | 370/498 |
| 2011/0003560 | A1 * | 1/2011 | Futaki et al. | 455/67.16 |
| 2011/0211457 | A1 * | 9/2011 | Larmo et al. | 370/241 |

FOREIGN PATENT DOCUMENTS

| | | |
|---|---|---|
| JP | 2004-80698 | 3/2004 |
| JP | 2004-112625 | 4/2004 |
| JP | 2005-323113 | 11/2005 |
| JP | 2009-206595 | 9/2009 |

* cited by examiner

*Primary Examiner* — Andrew Lai
*Assistant Examiner* — Andrew C Lee
(74) *Attorney, Agent, or Firm* — Katten Muchin Rosenman LLP

(57) ABSTRACT

A mobile communication system includes a radio base station apparatus performing hard handover processing in synchronization with a mobile terminal under radio communication therewith; and a control apparatus transmitting first hard handover processing start timing to the radio base station apparatus, wherein the radio base station apparatus decides a possibility of handover processing delay according to the first hard handover processing start timing, and on deciding there is a possibility of delay, performs the hard handover processing at second hard handover processing start timing later than the first hard handover processing start timing.

7 Claims, 15 Drawing Sheets

MAC: Media Access Control Layer
PHY: Physical Layer
TNL: Transport Network Layer MAC: Media Access Control Layer
PHY: Physical Layer
TNL: Transport Network Layer

MOBILE COMMUNICATION SYSTEM, RADIO BASE STATION APPARATUS AND HARD HANDOVER PROCESSING METHOD

CROSS-REFERENCE TO RELATED APPLICATION(S)

This application is based upon and claims the benefit of priority of the prior Japanese Patent Application No. 2009-122680, filed on May 21, 2009, the entire contents of which are incorporated herein by reference.

FIELD

The present invention relates to a mobile communication system performing hard handover (HHO) processing, a radio base station apparatus therefore and a hard handover processing method.

BACKGROUND

In a W-CDMA (Wideband Code Division Multiple Access) radio communication system, a third generation mobile communication system, an uninterruptible hard handover (HHO) is performed for service switchover, service transmission speed change, spreading code reassignment, etc. The service switchover processing signifies processing to switch over from control signal transmission to packet transmission, for example. Based on the criterion of reference timing CFN (Connection Frame Number), radio base station apparatus (BTS: Base Transceiver Station) and mobile terminal apparatus (UE: User Apparatus) perform the HHO processing under a specified identical CFN. The CFN is a counter with a period of 256 counts in the unit of 10 ms. The BTS and the UE count an identical CFN in synchronization, and simultaneously switch the service at the specified identical CFN. More specifically, in a physical channel (DPCH) between the BTS and the UE, for example, the HHO processing is performed at the time of switching transfer rates from 15 kbps to 240 kbps, or switching channels from "DPDCH+DPCCH", which is the DPCH channel standardized in Release 99 of the 3GPP, to "HS-DSCH", which is an HSDPA service standardized in Release 5.

Additionally, in the W-CDMA system, BTS switchover is not hard handover processing because a system that the UE simultaneously communicates with a plurality of BTS [rake reception, or soft handover (SHO)] is adopted when a radio wave condition between UE and BTS becomes bad (in consideration of quality as well as intensity). However, when a service switchover (for example, switching from a channel based on Release 99 to a channel based on Release 5) is made simultaneously with the BTS switchover, the service switchover concerned is hard handover processing. A frequency switchover in the BTS switchover is also hard handover processing. Further, in the patent document 1 illustrated below, there is disclosed an uninterruptible hard handover in the "expelling" control of a maintenance function.

In regard to CFN for designating timing to perform HHO processing, based on either a service switchover request from the UE side or a service switchover request from an upper level of base station control apparatus (RNC: Radio Network Controller) on the network side, a call processing unit in the RNC determines a CFN for specifying HHO timing, so as to notify the BTS and the UE. With this, the BTS and the UE performs HHO processing under the identical CFN.

FIG. 1 is a diagram illustrating an exemplary configuration of the W-CDMA system. The W-CDMA system is constituted of a mobile terminal (UE: User Apparatus), radio base station apparatus (BTS: Base Transceiver Station) and base station control apparatus (RNC: Radio Network Controller). Under the subordination of the base station control apparatus (hereafter referred to as RNC), a plurality of sets of radio base station apparatus (hereafter referred to as BTS) are allocated, although not illustrated in the figure. The BTS performs radio communication with a plurality of mobile terminals (hereafter referred to as UE) located in the BTS area concerned.

Each the UE, the BTS and the RNC includes a call control unit for managing call control, and a processing unit for processing each layer of the protocol in conformity of the OSI (Open System Interconnection) model. As a portion thereof, in FIG. 2, there are illustrated a baseband processing unit (BB unit) in the UE for performing MAC (Media Access Control) processing and physical layer processing (PHY processing) at the UE, a BB unit in the BTS for performing physical layer processing (PHY processing) and transport network layer processing (TNL processing) at the BTS, and a BB unit in the RNC for performing MAC processing and transport network layer processing (TNL processing) at the RNC. In a downlink, the MAC processing and the TNL processing at the RNC perform logical channel (DCCH: Dedicated Control Channel and DTCH: Dedicated Traffic Channel) transmission to the BTS, and the TNL processing and the PHY processing at the BTS perform transport processing of the logical channels, so as to transmit to the UE by mapping each logical channel to a physical channel (DPCH: Dedicated Physical Channel). The PHY processing and the MAC processing at the UE perform the conversion of the physical channel DPCH to the logical channel (DCCH, DTCH).

FIG. 2 is an operating sequence of HHO processing in the W-CDMA system. The call control unit in the RNC generates HHO request information including an HHO command and a CFN for HHO timing (S10), and sends to the BTS the HHO request information destined to the BTS through a C-Plane (Control Plane) (S12). The call control unit in the BTS receives the HHO request information destined to the BTS. Also, the call control unit in the RNC sends to the UE the HHO request information destined to the UE via the BB unit in the BTS (S14, S16). The HHO request information from the RNC to the UE is first transmitted to the BB unit in the BTS, through the logical channel of a U-Plane (User Plane) (S14), and is sent to the UE from the BB unit in the BTS through the physical channel (S16).

The call control unit in the UE performs the HHO processing at the timing of the specified CFN included in the received HHO request information.

On the other hand, the call control unit in the BTS sends the HHO request information received in S12 to the BB unit in the BTS which performs the HHO processing, (S18), and the BB unit in the BTS performs the HHO processing. At this time, when the notification in S18 is delayed due to the congestion of processing in the call control unit of the BTS, the execution of the HHO processing in the BB unit may be delayed from the timing of the specified CFN. FIG. 2 illustrates a case that the HHO processing in the BTS is performed at the timing of the specified CFN+3. In this case, because of the deviation of the HHO processing timing between the BTS and the UE, a missing data is produced in the above deviating period.

In FIG. 2, the deviation of the HHO processing timing between the BTS and the UE due to the processing delay in the call control unit of the BTS is exemplified. Similarly, due to a processing delay in the BB unit of the BTS, there may be cases that deviation of HHO processing timing be produced because of a delay of the HHO processing from the specified CFN in the BB unit of the BTS. Also, due to a processing delay in the BB unit of the BTS, deviation of HHO processing timing may be produced because of a transfer delay of the HHO request information to the UE, and an HHO processing delay from the specified CFN in the UE.

[Patent Document 1]

Japanese Laid-open Patent Publication No. 2004-80698

SUMMARY

According to an aspect of the invention, a mobile communication system includes: a radio base station apparatus performing hard handover processing in synchronization with a mobile terminal under radio communication therewith; and a control apparatus transmitting first hard handover processing start timing to the radio base station apparatus, wherein the radio base station apparatus decides a possibility of handover processing delay according to the first hard handover processing start timing, and on deciding there is a possibility of delay, performs the hard handover processing at second hard handover processing start timing later than the first hard handover processing start timing.

According to an aspect of the invention, a radio base station apparatus performing hard handover processing in synchronization with a mobile terminal under radio communication therewith includes: a call control unit configured to receive first hard handover processing start timing from upper-level apparatus; a decision unit configured to decide a possibility of handover processing delay according to the first handover start timing; and a baseband processing unit configured to accommodate a plurality of channels and performing baseband processing including hard handover processing for each channel, and configured to perform hard handover processing at second hard handover processing start timing later than the first hard handover processing start timing when the decision unit decides there is a possibility of delay.

According to an aspect of the invention, a hard handover processing method for a radio base station apparatus under radio communication with a mobile terminal, includes the steps of: receiving first hard handover processing start timing from upper-level apparatus; deciding a possibility of hard handover processing delay according to the first hard handover processing start timing; and performing hard handover processing at second hard handover processing start timing later than the first hard handover processing start timing on deciding there is a possibility of delay.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figure 1:
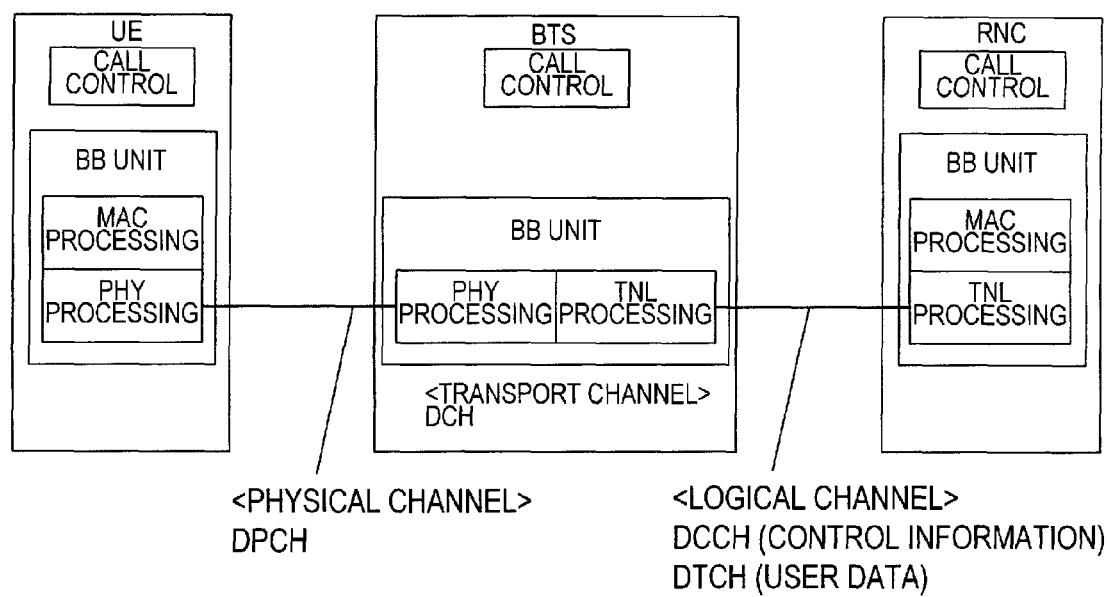
FIG. 1 is a diagram illustrating an exemplary configuration of the W-CDMA system.
Figure 2:
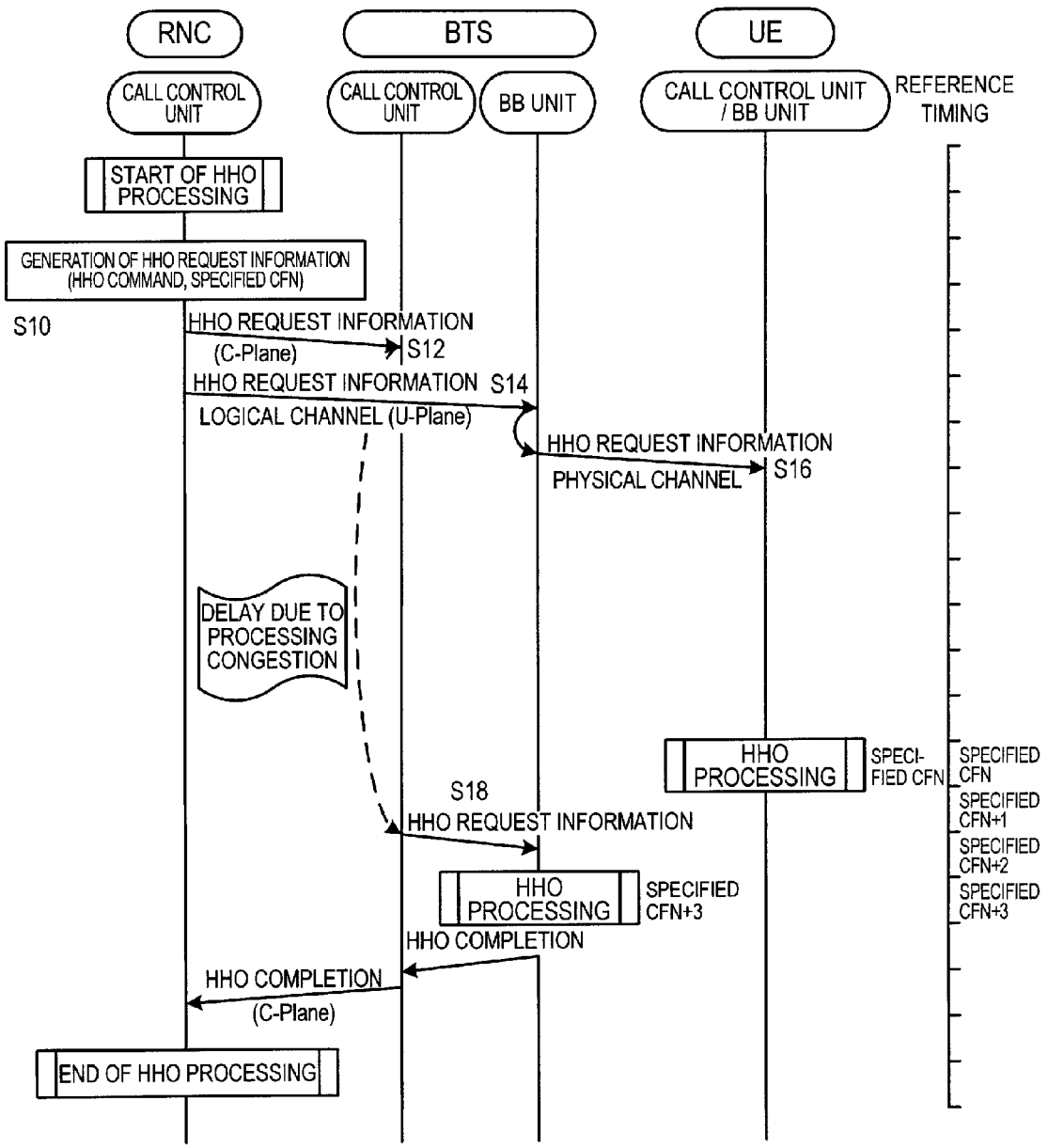
FIG. 2 is an operating sequence of HHO processing in the W-CDMA system.
Figure 3:
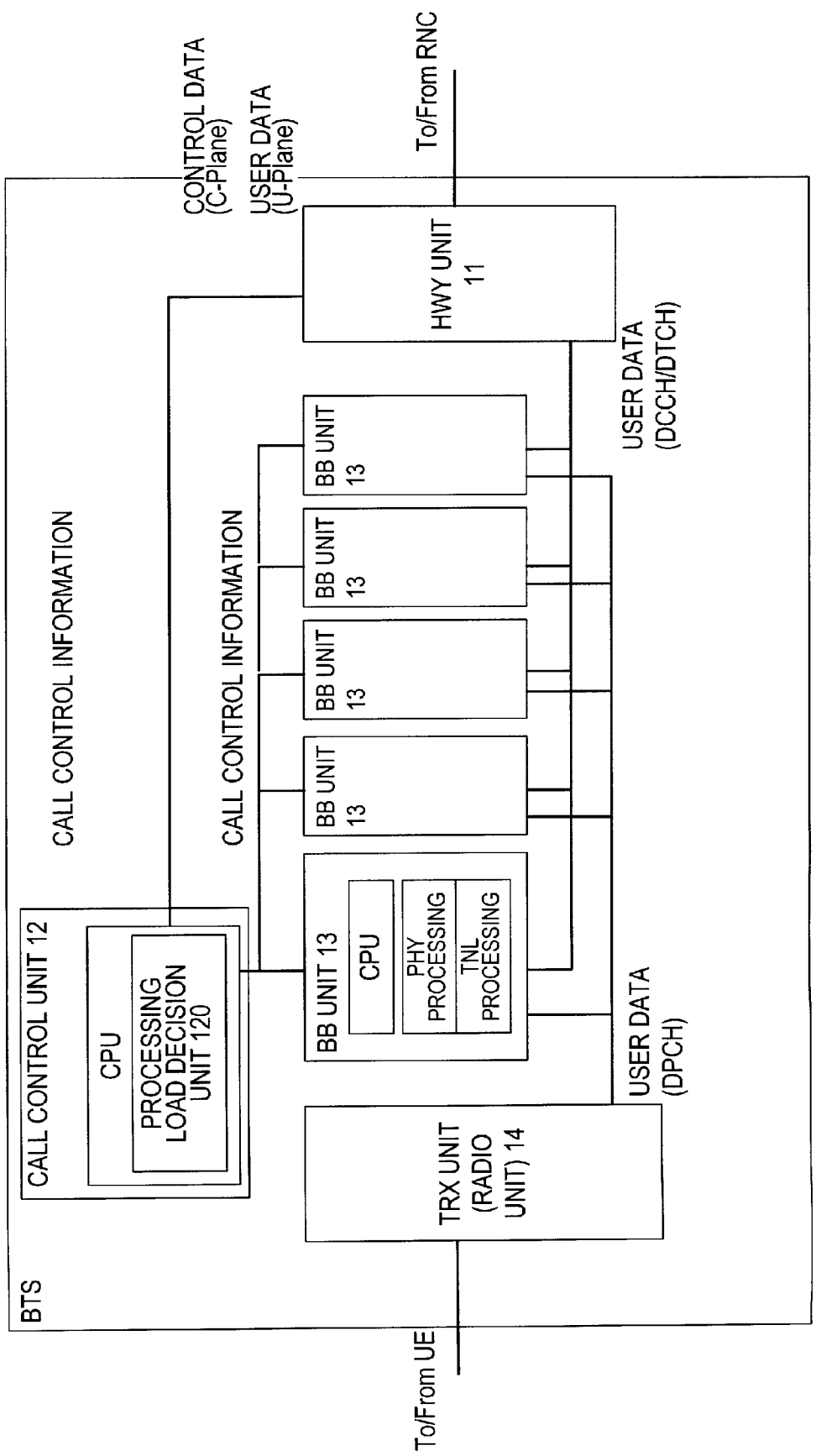
FIG. 3 is a diagram illustrating a first exemplary configuration of radio base station apparatus (BTS) according to a present embodiment.

FIG. 3 is a diagram illustrating a first exemplary configuration of radio base station apparatus (BTS) according to a present embodiment. The first exemplary configuration is an exemplary configuration of the radio base station apparatus (BTS) in the W-CDMA system. The BTS includes a highway (HWY) unit 11 having an interface function for transmitting/receiving data between with the RNC, a call control unit 12 for managing call control information from the RNC, a plurality of baseband units 13 for performing physical channel processing according to the call control information, and a radio unit 14 for performing radio communication with a mobile terminal. BB (Baseband) unit 13 performs TNL processing and PHY processing. Each of call control unit 12 and BB unit 13 includes a CPU (Central Processing Unit), and various kinds of processing are performed by the execution of processing programs in the CPU.

Through the C-plane (Control Plane), highway unit 11 receives from the RNC the call control information including hard handover (HHO) request information. The HHO request information includes an HHO command and a CFN (Connection Frame Number) specifying HHO timing. The HHO request information, which is call control information in the C-plane, is forwarded to call control unit 12 via highway unit 11, and then transferred from call control unit 12 to BB unit 13. Based on the HHO request information, BB unit 13 performs hard handover processing such as a service switchover at the specified CFN timing.

On the other hand, highway unit 11 receives DCCH (Dedicated Control Channel), a logical channel of control information, through the U-plane (User Plane). The logical channel DCCH includes HHO request information to the UE, and the HHO request information to be destined to the UE also includes an HHO command and a CFN specifying HHO timing. The logical channel DCCH is transmitted from highway unit 11 to BB unit 13. After transport-processed by BB unit 13, the logical channel DCCH is transmitted to the UE by a radio unit 14 over the physical channel (DPCH: Dedicated Physical Channel).

The radio base station apparatus includes a plurality of BB units 13. Each BB unit 13 can process a plurality of channels of the order of 100 channels. As an example, when 15 sets of BB units 13 are mounted on the radio base station apparatus, 1500 channels can be processed in the entire radio base station apparatus. The processing of 1 channel corresponds to processing for one UE.

Call control unit 12 manages call control information relative to a plurality of BB units 13. In the CPU of call control unit 12, when call control for a plurality of channels are concentrated, resulting in congestion, the HHO command from call control unit 12 to BB unit 13 may be delayed in some cases. Also, when processing for a plurality of channels is congested in each BB unit 13, the HHO processing in BB unit 13 having received the HHO command may be delayed, making it impossible to be in time for the specified CFN.

According to the present embodiment, a processing load decision unit 120 in call control unit 12 decides whether or not the HHO processing is possible under the specified CFN included in the HHO request information (a possibility of delay), and if it is decided to be not in time (there is a delay), the RNC is requested to change the specified CFN. More specifically, processing load decision unit 120 requests the RNC to delay the CFN specified for the HHO processing execution.

Based on the number of processing channels or a processing channel capacity in BB unit 13, processing load decision unit 120 decides whether the HHO processing under the specified CFN can be made. The number of processing channels per BTS is defined as the number of channels being presently processed in the unit of BTS relative to the maximum number of channels processable in the entire BTS, which is expressed in the following equation (A).

The number of processing channels per BTS (%)=(the number of channels presently processed in the unit of BTS)/(the maximum number of channels in the unit of BTS)     (A)

For example, in case that the number of channels being presently processed is 1300 channels and the maximum number of channels is 1500 channels, the number of processing channels per BTS=1300/1500=87%.

Also, a processing channel capacity per BTS is defined as a channel capacity being presently processed relative to the channel capacity processable by the entire BTS. Here, the channel capacity is defined as the number of channels×SF (Spreading Factor) by which physical channels are being processed. According to symbol rates, the SF takes values illustrated below.

| SF (Spreading Factor) | Symbol rate (kbps) |
|---|---|
| 256 | 15 |
| 128 | 30 |
| 64 | 60 |
| . | . |
| . | . |
| . | . |
| 4 | 960 |

Let $SF_{current}$ to be SF of each channel being presently processed, and $SF_{max}$ to be SF processable for the maximum number of channels, then, the processing channel capacity per BTS is defined by the following equation (B).

The number of processing channels (%) per BTS =     (B)

$$\sum_{1}^{\text{The Number of channel}} \left( \frac{1}{SFcurrent \text{ to be } SF \text{ of each channel being presently processed}} \right) \Bigg/ \left( \text{The Maximum number of channels per } BTS \times \frac{1}{SFmax \text{ processable for the Maximum number of channels per } BTS} \right)$$

For example, let
$SF_{max}$ to be SF processable for the maximum number of channels in BTS=16,
$SF_{current}$ to be SF of the channel being presently processed=64,
the number of channels being presently processed=1300,
then,
Processing channel capacity (%)=$\Sigma(1/64)/(1500\times1/16)$=
(1300/64)/(1500/16)=22(%)
is obtained.

Processing load decision unit 120 calculates the number of processing channels per BTS and the processing channel capacity per BTS, and compares each calculated value with a threshold A. When the calculated value is smaller than the threshold A, it is decided that "HHO is processable under the specified CFN (without delay)", while when the calculated value is greater than, and inclusive of, the threshold A, it is decided that "HHO is not processable under the specified CFN (with delay)". When it is decided that "HHO is processable under the specified CFN (without delay)", call control unit 12 transfers the HHO request information received from RNC to BB unit 13 without modifying it, and BB unit 13 performs HHO processing under the specified CFN included in the HHO request information.

When it is decided that "HHO is not processable under the specified CFN", call control unit 12 transmits an HHO timing change request to the RNC, without transferring the HHO request information received from the RNC to BB unit 13.

Figure 4:
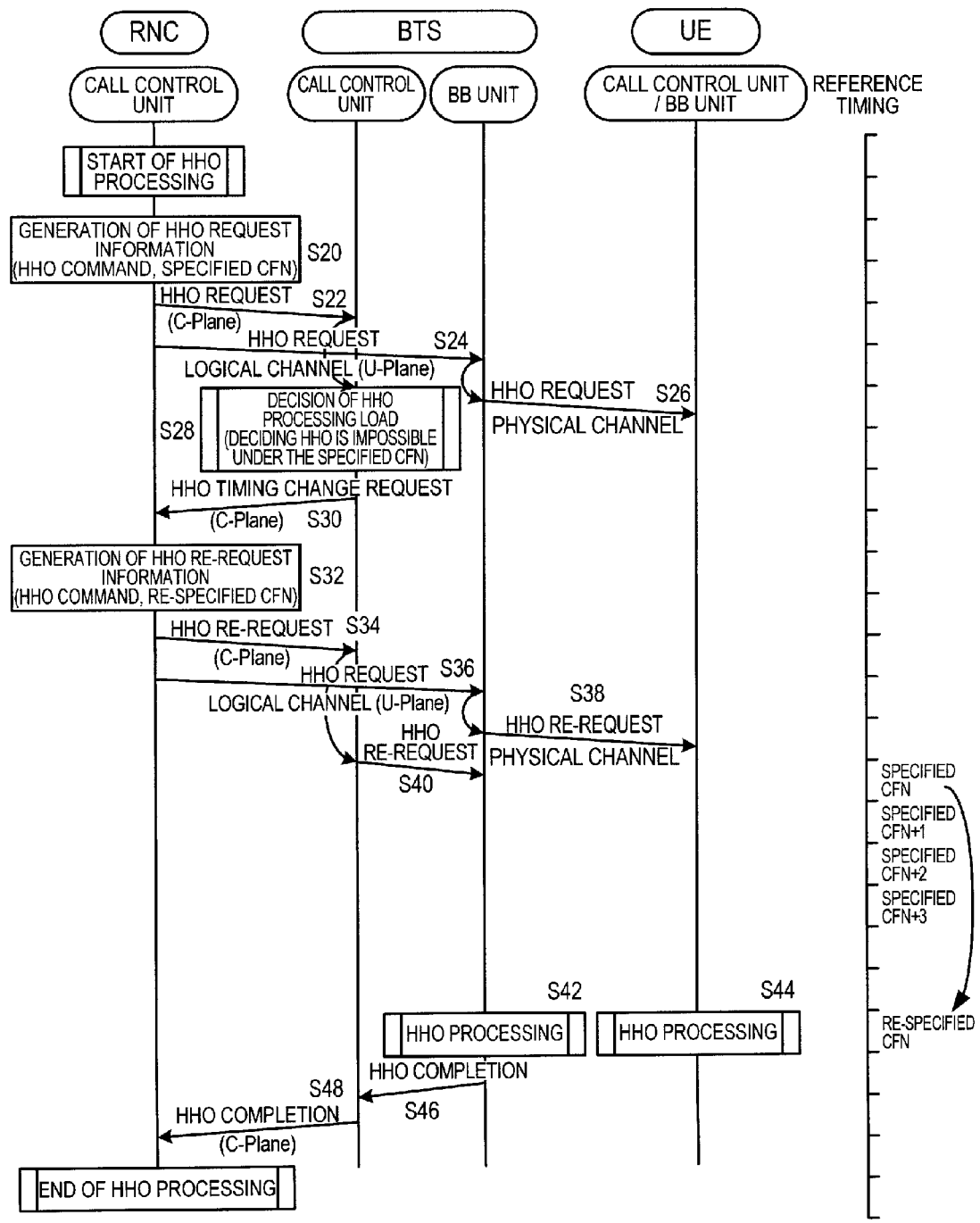
FIG. 4 is a first HHO processing sequence according to the present embodiment.

FIG. 4 is a first HHO processing sequence according to the present embodiment. The first HHO processing sequence is a sequence performed in the first exemplary configuration illustrated in FIG. 3, when call control unit 12 in the BTS requests to change HHO timing.

The call control unit in the RNC generates HHO request information including an HHO command and a CFN for HHO timing (S20), and sends to the BTS the HHO request information destined to the BTS through the C-plane (Control Plane) (S22). Call control unit 12 in the BTS receives the HHO request information destined to the BTS. Also, the call control unit in the RNC sends to a UE the HHO request information destined to the UE, via BB unit 13 in the BTS (S24, S26). First, the HHO request information from the RNC to the UE is input to BB unit 13 in the BTS through the U-plane (User Plane) (S24), and then is sent from BB unit 13 in the BTS to the UE via a physical channel (S26).

When call control unit 12 in the BTS receives the HHO request information, processing load decision unit 120 in call control unit 12 executes the decision of HHO processing capability (S28). In the decision of HHO processing capability by processing load decision unit 120, if "HHO not processable under the specified CFN" is decided, call control unit 12 does not transfer the HHO request information received from the RNC to BB unit 13, and instead, transmits an HHO timing change request to the RNC through the C-plane (S30).

On receiving the HHO timing change request, the call control unit in the RNC generates HHO re-request information including a CFN specified afresh (S32). The CFN specified afresh (re-specified CFN) signifies a timing value later than the [originally specified CFN] included in the HHO request information in S20. For example, the re-specified CFN is a value uniformly delayed for a predetermined value from the originally specified CFN (for example, the originally specified CFN+8, or the like).

Alternatively, it is possible to assign a different delay amount to the re-specified CFN, according to the decision result of the HHO processing capability. More specifically, according to the degree of excess from the threshold A of the number of processing channels or the processing channel capacity calculated on the basis of the aforementioned equation (1) or (2), a value to be added to the specified CFN is changed. For example, when the number of processing channels or the processing channel capacity is not smaller than the threshold A and smaller than [the threshold A×1.1], the re-specified CFN may be set to be [the originally specified CFN+8], while when the number of processing channels or the processing channel capacity is not smaller than [the threshold A×1.1], the re-specified CFN may be set to be [the originally specified CFN+16]. An appropriate CFN so as not to produce a delay is settable.

The call control unit in the RNC generates the HHO re-request information including the HHO command and the re-specified CFN, and sends to the BTS the HHO re-request information destined to the BTS through the C-plane (Control Plane) (S34). Call control unit 12 in the BTS receives the HHO re-request information destined to the BTS. Also, the call control unit in the RNC transmits HHO re-request information, including the HHO command and the re-specified CFN, destined to the UE (S36, S38). First, the HHO re-request information from the RNC to the UE is input to BB unit 13 in the BTS through the U-plane (User Plane) (S36), and then sent from BB unit 13 in the BTS to the UE via the physical channel (S38).

The HHO re-request information including the re-specified CFN destined to the UE is received by the UE before the timing of the specified CFN that is specified by the original HHO request information. On receiving the HHO re-request information, the UE overwrites the re-specified CFN to specify HHO processing start timing, so as not to perform the HHO processing at the timing of the originally specified CFN, but to perform the HHO processing at the timing of the re-specified CFN (S44).

Also, call control unit 12 in the BTS sends the HHO re-request information, received in S34, to BB unit 13 in the BTS (S40). According to a CPU congestion condition in the BTS, the RNC has set the re-specified CFN to the HHO re-request information so that the HHO processing timing is not delayed, and therefore, in regard to the HHO re-request information received after the HHO timing change request, the load processing decision in processing load decision unit 120 is not performed. However, it may also be possible to perform the load processing decision.

On receiving the HHO re-request information, at the timing of the re-specified CFN included therein, BB unit 13 in the BTS performs the HHO processing (S42). By this, it is possible to make the HHO processing timing coincide between the UE and the BTS. On completion of the HHO processing, BB unit 13 in the BTS sends an HHO completion notification to call control unit 12 in the BTS (S46). Call control unit 12 in the BTS then sends the above HHO completion notification to the RNC (S48).

As such, the BTS decides the congestion condition of call control unit 12, and when it is decided that the load of call control unit 12 is high, and that the HHO processing under the specified CFN is not possible, the BTS requests the RNC, the upper-level apparatus, to change the HHO timing. Then, the RNC re-specifies a CFN of which timing is later than the specified CFN, and sends the re-specified CFN to both the BTS and the UE. By this, the BTS and the UE can perform the HHO processing at simultaneous timing.

Figure 5:
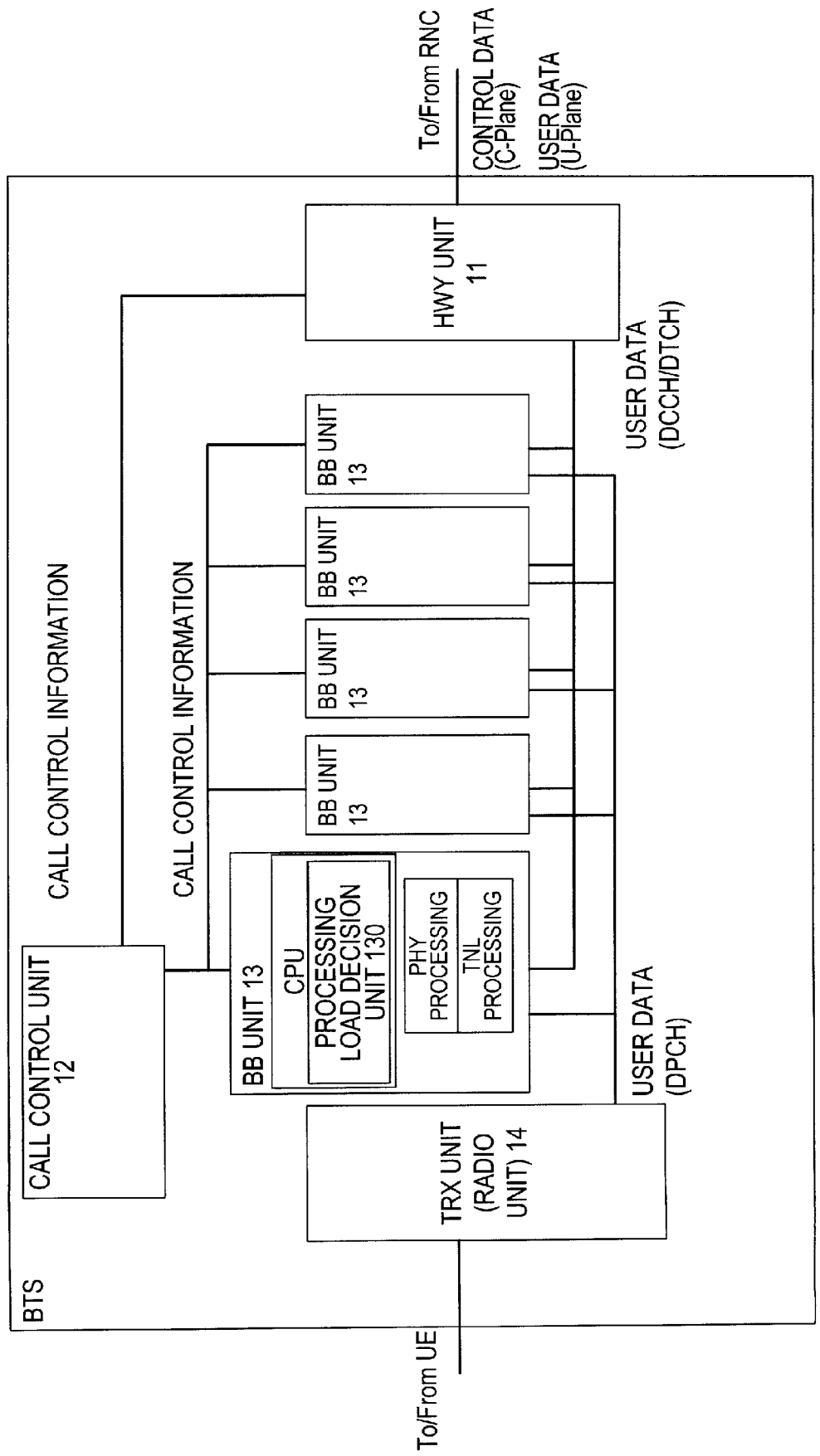
FIG. 5 is a diagram illustrating a second exemplary configuration of the radio base station apparatus (BTS).

FIG. 5 is a diagram illustrating a second exemplary configuration of the radio base station apparatus (BTS). In the second exemplary configuration of the BTS, each BB unit 13 in the BTS includes a processing load decision unit 130. According to the second exemplary configuration, processing load decision unit 130 in each BB unit 13 decides the congestion condition of each BB unit, and decides whether the HHO processing is possible under the specified CFN.

Based on the number of processing channels or the processing channel capacity of each BB unit 13, processing load decision unit 130 in each BB unit 13 decides whether the HHO processing is possible (possibility of delay) under the specified CFN. In the second exemplary configuration, the number of processing channels per BB unit is defined by the number of channels being presently processed in each BB unit to the maximum number of channels per BB unit, which is expressed by the equation (C) illustrated below. Also, a processing channel capacity per BB unit is defined by the equation (D) illustrated below.

The number of processing channels per BB unit (%) =
(the number of channels presently processed per BB unit)/(the maximum number of channels per BB unit)      (C)

The number of processing channels (%) per $BBsection =$     (D)

$$\sum_{1}^{\text{The number of channel}} \left( \frac{1}{SFcurrent \text{ of channel presently processed per } BBsection} \right) / \left( \text{The maximum number of channels per } BB \text{ section} \times \frac{1}{SFmax \text{ processable for the Maximum number of channels per } BB \text{ section}} \right)$$

Processing load decision unit 130 calculates the number of processing channels per BB and a processing channel capacity per BB, and compares each calculated value with a predetermined threshold B in which the HHO processing can be performed without delay. When the calculated value is smaller than the threshold B, it is decided that "HHO is processable under the specified CFN (without delay)", is while when the calculated value is greater than, and inclusive of, the threshold B, it is decided that "HHO is not processable under the specified CFN (with delay)". The above decision result is sent to call control unit 12. When it is decided that "HHO is processable under the specified CFN", BB unit 13 performs the HHO processing as it is, under the specified CFN included in the HHO request information.

When it is decided that "HHO is not processable under the specified CFN", call control unit 12 does not transfer the HHO request information received from the RNC to BB unit 13, and instead, transmits an HHO timing change request to the RNC.

Figure 6:
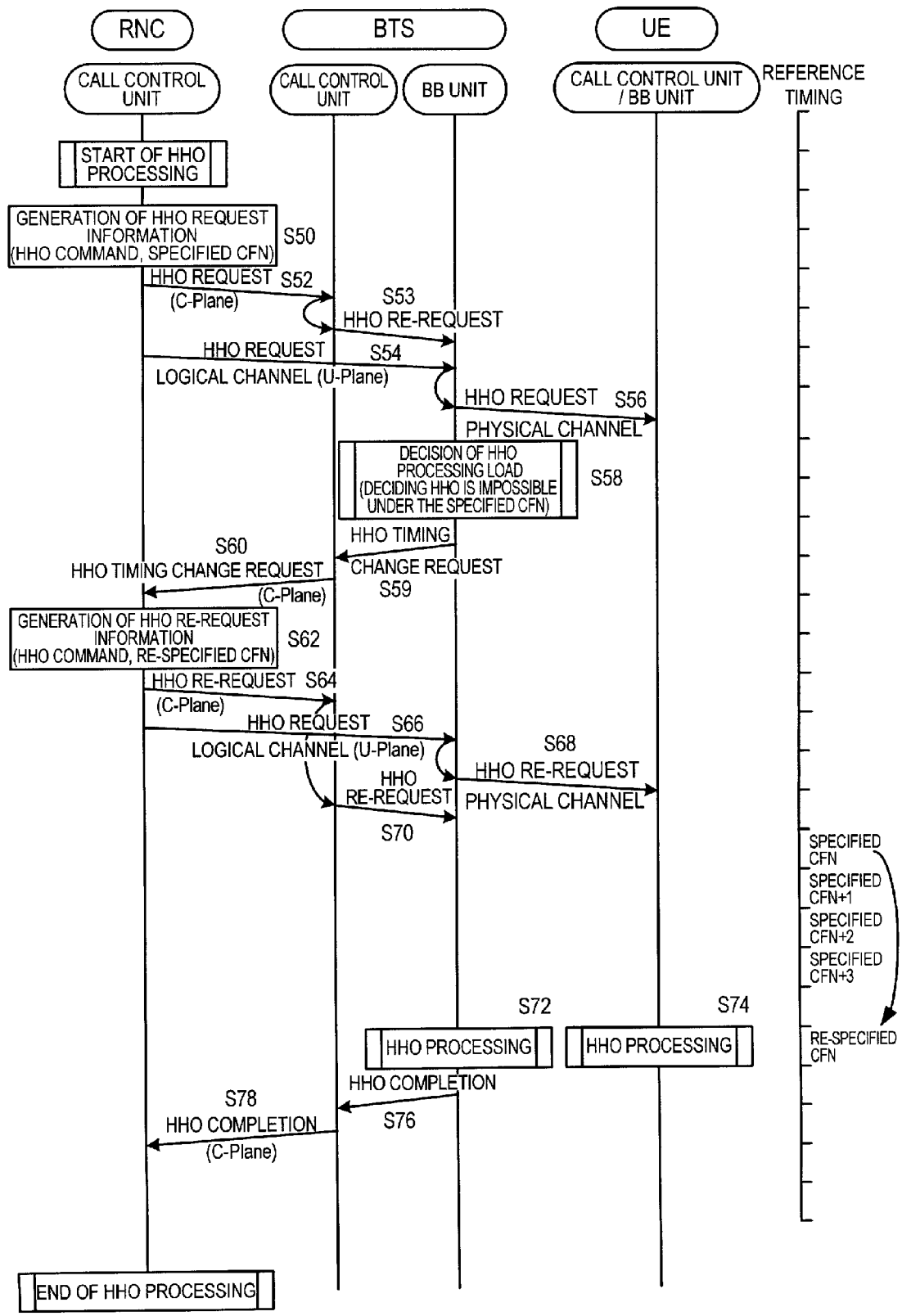
FIG. 6 is a second HHO processing sequence according to the present embodiment.

FIG. 6 is a second HHO processing sequence according to the present embodiment. The second HHO processing sequence is a sequence when BB unit 13 in the BTS issues an HHO timing change request in the second exemplary configuration illustrated in FIG. 5.

The call control unit in the RNC generates HHO request information including an HHO command and a CFN for HHO timing (S50), and sends to the BTS the HHO request information destined to the BTS through the C-plane (Control Plane) (S52). Call control unit 12 in the BTS transfers the HHO request information destined to the BTS, which is received in S52, to BB unit 13 that performs the HHO processing (S53).

Also, the call control unit in the RNC sends to a UE the HHO request information destined to the UE, via BB unit 13 in the BTS (S54, S56). First, the HHO request information from the RNC to the UE is input to BB unit 13 in the BTS through the U-plane (User Plane) (S54), and then sent from BB unit 13 in the BTS to the UE via the physical channel (S56).

When BB unit 13 in the BTS receives the HHO request information destined to the BTS in S53, processing load decision unit 130 in BB unit 13 performs the decision of HHO processing capability (S58). In the decision of HHO processing capability by processing load decision unit 130, if "HHO not processable under the specified CFN" is decided, BB unit 13 transmits an HHO timing change request to call control unit 12 (S59). Call control unit 12 then transmits to the RNC the HHO timing change request from BB unit 13, through the C-plane (S60).

The subsequent processing is similar to the processing illustrated in FIG. 3. Namely, on receiving the HHO timing change request, the call control unit in the RNC generates HHO re-request information including a CFN specified afresh (S62). The CFN specified afresh (re-specified CFN) has a timing value later than the [originally specified CFN] included in the HHO request information in S50. For example, the re-specified CFN is a value uniformly delayed for a predetermined value from the originally specified CFN (for example, the originally specified CFN+8, or the like). As having been described above, it may also be possible to assign a different delay amount to the re-specified CFN, according to the decision result of the HHO processing capability.

The call control unit in the RNC generates the HHO re-request information including the HHO command and the re-specified CFN, and sends to the BTS the HHO re-request information destined to the BTS through the C-plane (Control Plane) (S64). Call control unit 12 in the BTS receives the HHO re-request information destined to the BTS. Also, the call control unit in the RNC transmits HHO re-request information, including the HHO command and the re-specified CFN, destined to the UE (S66, S68). First, the HHO re-request information from the RNC to the UE is input to BB unit 13 in the BTS through the U-plane (User Plane) (S66), and then sent from BB unit 13 in the BTS to the UE via the physical channel (S68).

The HHO re-request information including the re-specified CFN destined to the UE is received by the UE before the timing of the specified CFN that is specified by the original HHO request information. On receiving the HHO re-request information, the UE overwrites the re-specified CFN to specify HHO processing start timing, so as not to perform the HHO processing at the timing of the originally specified CFN, but to perform the HHO processing at the timing of the re-specified CFN (S74).

Also, the call control unit in the BTS sends the HHO re-request information, received in S64, to BB unit 13 in the BTS (S70). According to a CPU congestion condition in BB unit 13 of the BTS, the RNC has set the re-specified CFN to the HHO re-request information so that the HHO processing timing is not delayed, and therefore, in regard to the HHO re-request information received after the HHO timing change request, the load processing decision is not performed in processing load decision unit 130 of BB unit 13. However, it may also be possible to perform the load processing decision.

On receiving the HHO re-request information, at the timing of the re-specified CFN included therein, BB unit 13 in the BTS performs the HHO processing (S72). By this, it is possible to make the HHO processing timing coincide between the UE and the BTS. On completion of the HHO processing, BB unit 13 in the BTS sends an HHO completion notification to call control unit 12 in the BTS (S76). Call control unit 12 in the BTS then sends the above HHO completion notification to the RNC (S78).

As such, the BTS decides the congestion condition of BB unit 13, and when it is decided that the load of BB unit 13 is high, and that the HHO processing under the specified CFN is not possible, the BTS requests the RNC, the upper-level apparatus, to change the HHO timing. Then, the RNC re-specifies a CFN of which timing is later than the specified CFN, and sends the re-specified CFN to both the BTS and the UE. By this, the BTS and the UE can perform the HHO processing at simultaneous timing.

Figure 7:
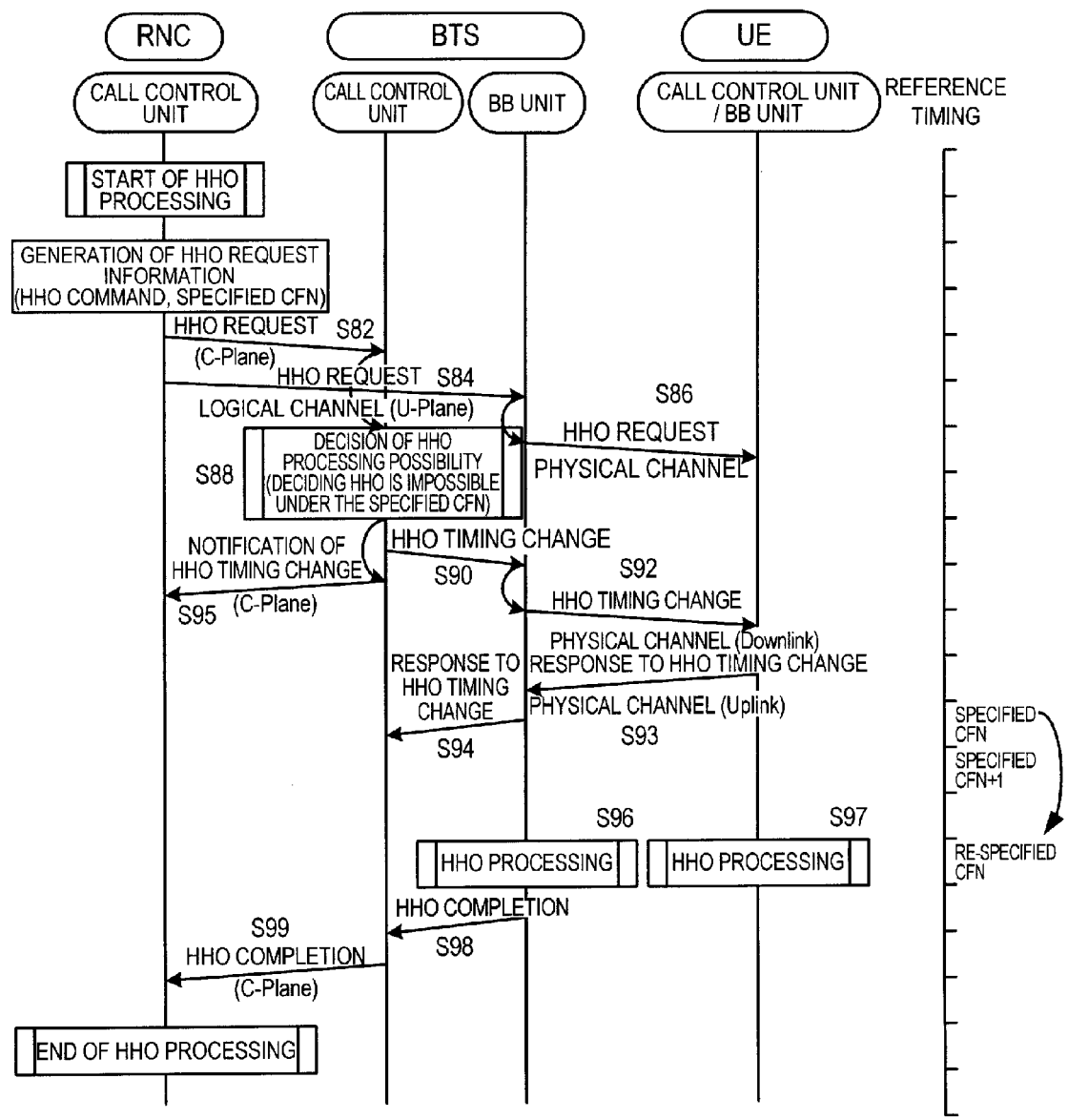
FIG. 7 illustrates a third HHO processing sequence according to the present embodiment.

FIG. 7 illustrates a third HHO processing sequence according to the present embodiment. The third HHO processing sequence is a sequence when call control unit 12 in the BTS directly commands the UE to change HHO timing in the first exemplary configuration illustrated in FIG. 3.

The call control unit in the RNC generates HHO request information including an HHO command and a CFN for HHO timing (S80), and sends to the BTS the HHO request information destined to the BTS through the C-plane (Control Plane) (S82). Call control unit 12 in the BTS receives the HHO request information destined to the BTS. Also, the call control unit in the RNC sends to a UE the HHO request information destined to the UE via BB unit 13 in the BTS (S84, S86). First, the HHO request information from the RNC to the UE is input to BB unit 13 in the BTS through the U-plane (User Plane) (S84), and then sent from BB unit 13 in the BTS to the UE via the physical channel (S86).

When call control unit 12 in the BTS receives the HHO request information, processing load decision unit 120 in call control unit 12 performs the decision of HHO processing capability (S88). In the decision of HHO processing capability by processing load decision unit 120, if "HHO not processable under the specified CFN" is decided, call control unit 12 in the BTS sets a re-specified CFN having a value delayed from the specified CFN, and sends HHO timing change command information, including an HHO timing change command and the changed re-specified CFN, to the UE via the BB unit 13 (S90, S92). The transmission of the HHO timing change command information from BB unit 13 to the UE (S92) will be described later. The UE sends to BB unit 13 a response corresponding to the HHO timing change command information (S93), and the BB unit 13 transfers the above response to call control unit 12 (S94).

Call control unit 12 in the BTS notifies the RNC that the HHO processing timing has been changed, through the C-plane (S95). After sending the HHO request information (S82, S84), the RNC has started an HHO completion supervision timer for supervising whether the HHO processing has been normally completed within a specified time. On receiving the HHO timing change command information from BB unit 13, the RNC changes (extends) the set time of the HHO completion supervision timer, to control to suppress the occurrence of alarm operation.

The HHO timing change command information destined to the UE, which includes the re-specified CFN, is received by the UE before the timing of the specified CFN that is specified by the original HHO request information. On receiving the HHO timing change command information, the UE overwrites the re-specified CFN to specify HHO processing start timing, so as not to perform the HHO processing at the timing of the specified CFN, but to perform the HHO processing at the timing of the re-specified CFN (S97).

On receiving the HHO timing change command information from call control unit 12, at the timing of the re-specified CFN included therein, BB unit 13 in the BTS performs the HHO processing (S96). By this, it is possible to make the HHO processing timing coincide between the UE and the BTS. On completion of the HHO processing, BB unit 13 in the BTS sends an HHO completion notification to call control unit 12 in the BTS (S98). Call control unit 12 in the BTS then sends the above HHO completion notification to the RNC (S99).

In step S92 illustrated in FIG. 7, the transmission of the HHO timing change command information from BB unit 13 to the UE through the physical channel (DPCH) can be realized by using an unused bit in the DPCH format for the downlink of W-CDMA.

Figure 8:
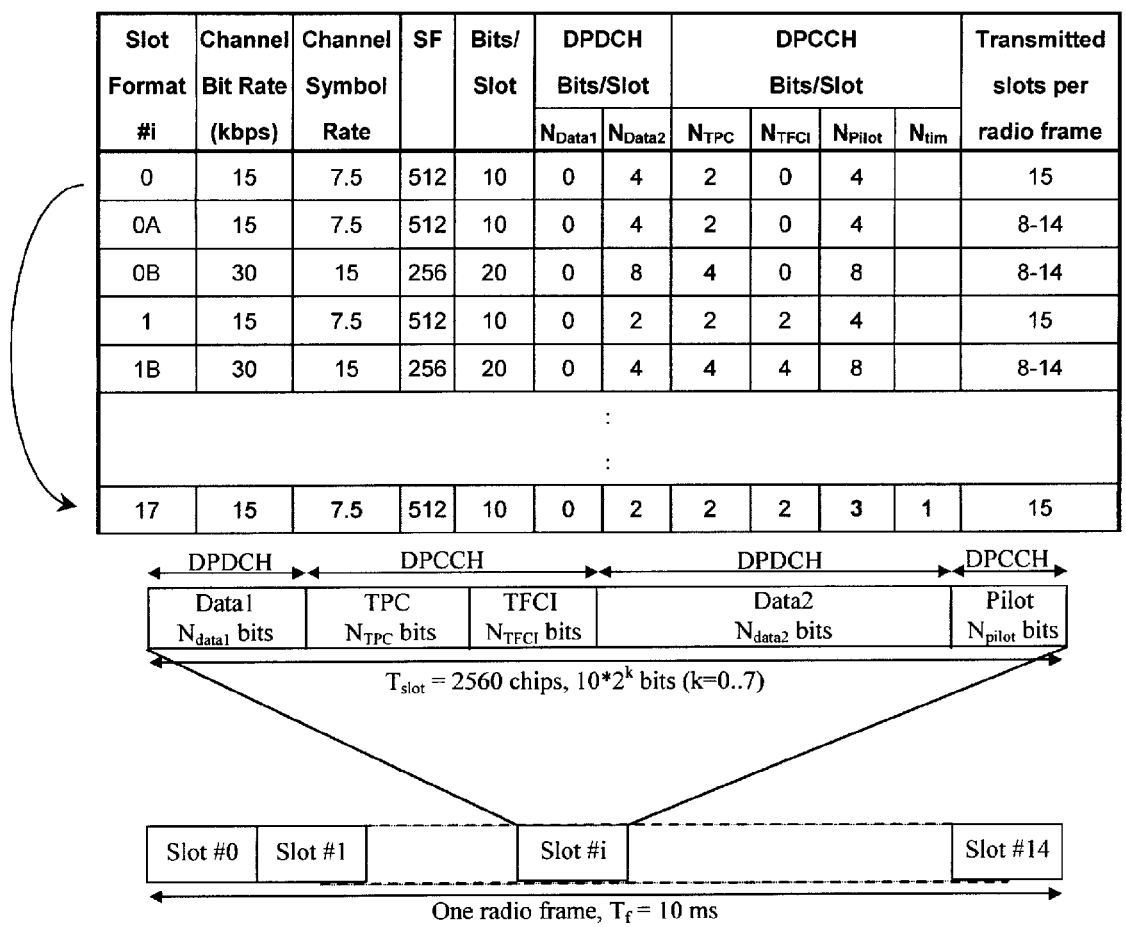
FIG. 8 illustrates a DPCH format for the downlink of W-CDMA.

FIG. 8 illustrates a DPCH format for the downlink of W-CDMA. The DPCH format illustrated in FIG. 8 is a slot format for one slot (where 1 frame=10 ms, and ¹⁄₁₅ of 1 frame is 1 slot=666.7 μsec). Numbers #0 to #1B in the slot format conform to the existing format. According to the present embodiment, 1 bit among pilot bits Npilot in the existing format is assigned to a bit Ntim for HHO timing change command information. For example, a slot format number #17 is a new format in which 1 bit out of the pilot bits Npilot in a slot format number #0 is assigned to the Ntim bit. In regard to other slot formats, it is possible to define in a similar manner. If the physical channel is transmitted on the basis of 1 frame=15 slot, it is possible to assign 15 bits per frame to the HHO timing change command information. As a breakdown of 15 bits, for example, 7 bits are assigned to the control bits for the HHO timing change command, and 8 bits are assigned for the re-specified CFN.

Control bits (7 bits)
=if 0x00, no HHO timing change command exists (normal operation).
=if 0x01, HHO timing change command exists.
Re-specified CFN (8 bits)=0x00-0XFF (0-255)

Figure 9:
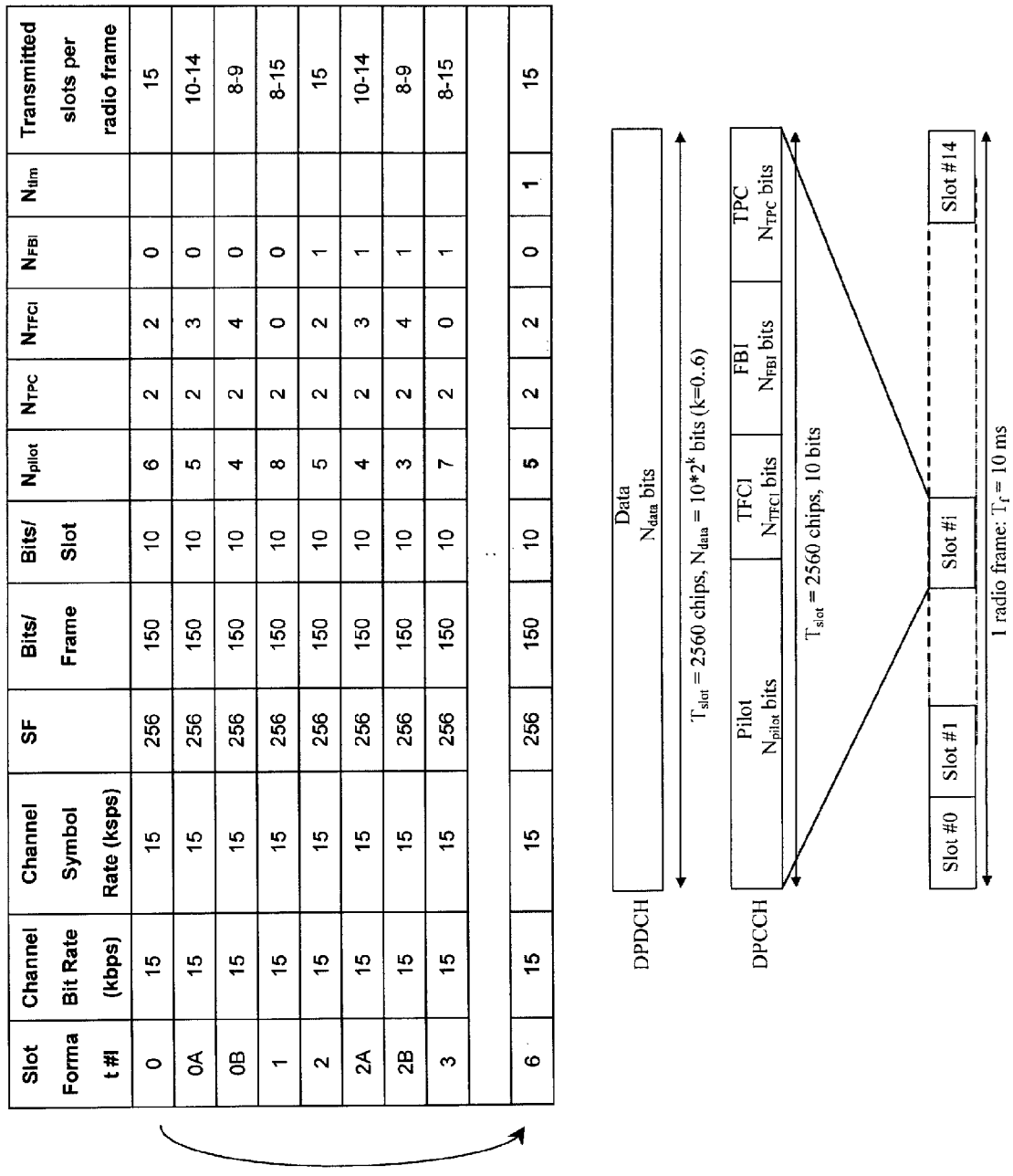
FIG. 9 illustrates a DPCH format for the uplink of W-CDMA.

FIG. 9 illustrates a DPCH format for the uplink of W-CDMA. Also in the DPCH format for the uplink, a bit is set for carrying response information from the UE, in response to the HHO timing change command information from BB unit 13 of the BTS. Slot format numbers #0-#3 are existing format. According to the present embodiment, 1 bit among the pilot bits Npilot in the existing format is assigned to a bit Ntim for response information to the HHO timing change command information. For example, a slot format number #6 is a new format in which one of the pilot bits Npilot in a slot format number #0 is assigned to the Ntim bit. In regard to other slot formats, it is possible to define in a similar manner.

In FIG. 8 and FIG. 9, format changes on the DPCH channel are exemplified. In regard to other physical channels, for example, physical channels processable by the BTS, such as HS-DPCCH for HSDPA and E-DPCCH for HSUPA, it is also possible to change the formats.

Further, according to the embodiments described above, the change operation of the HHO processing timing in the W-CDMA system has been described. However, it is not limited to the W-CDMA system. For example, it is applicable to other radio communication systems, including handover processing in the LTE (Long Term Evolution) system. In the following, embodiments applicable to the LTE system will be described.

Figure 10:
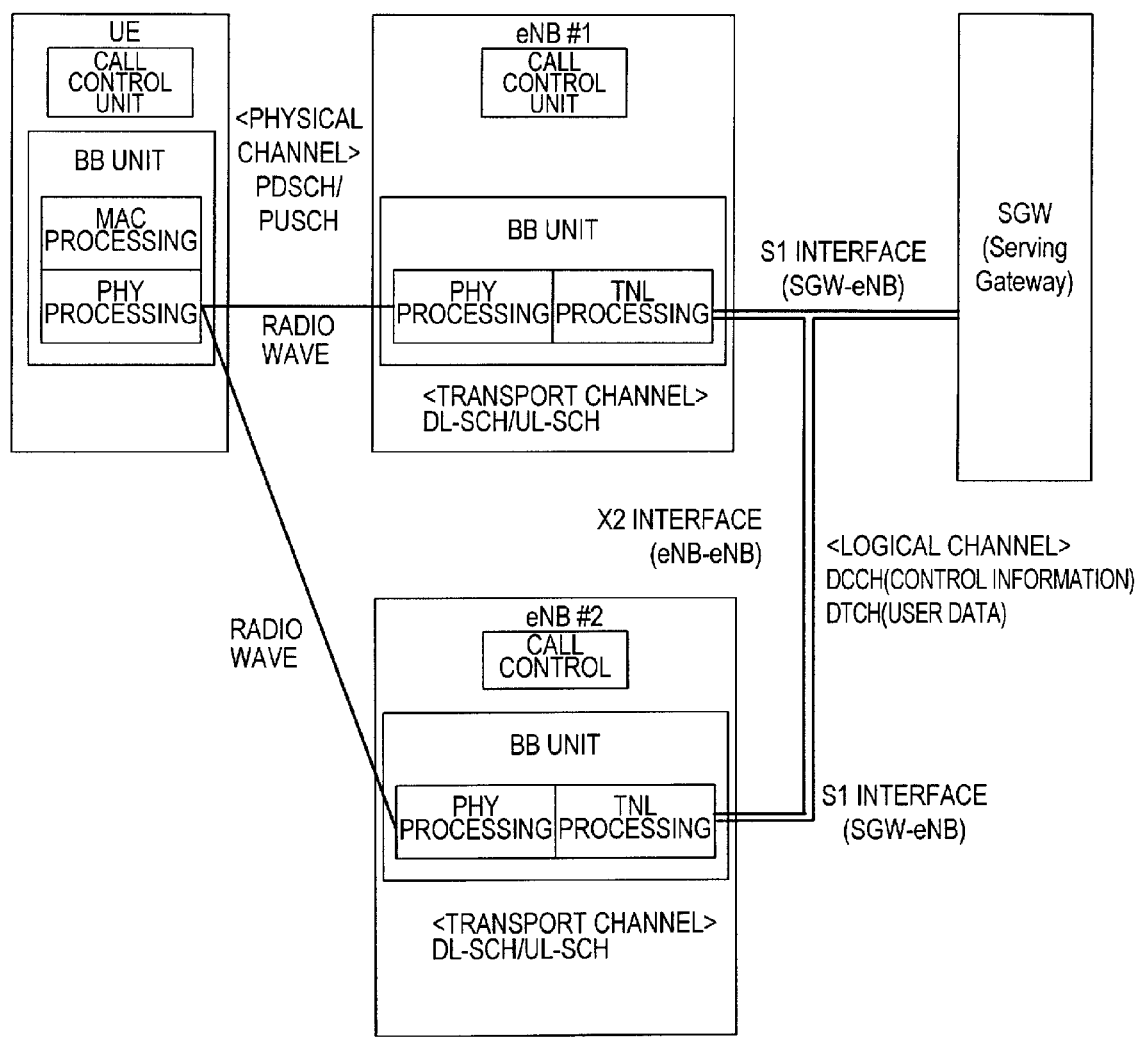
FIG. 10 is a diagram illustrating an exemplary configuration of the LTE system according to the present embodiment.

FIG. 10 is a diagram illustrating an exemplary configuration of the LTE system according to the present embodiment. The LTE system is configured of a mobile terminal (UE: User Apparatus), radio base station apparatus (eNB: evolved Node B) and SGW (Serving Gateway). A plurality of sets of the radio base station apparatus (hereafter referred to as eNB in the explanation of the LTE system) are disposed. In FIG. 10, to explain a radio link switchover between the eNBs by the UE, two eNBs (eNB#1, eNB#2) are illustrated. Each eNB can perform radio communication with a plurality of UEs in the self-area. The SGW transfers traffic to the IP network.

The UE and the eNB respectively include call control units for managing call control, and processing units for performing layer processing of the protocol in conformity of the OSI (Open System Interconnection) model. As a portion thereof, in FIG. 10, there are illustrated a baseband processing unit (BB unit) in the UE, which performs MAC (Media Access Control) processing and physical layer processing (PHY processing) in the UE, and a BB unit in the eNB, which performs PHY processing and transport network layer processing (TNL processing) in the eNB. In a downlink, the eNB receives logical channels (DCCH: Dedicated Control Channel, DTCH: Dedicated Traffic Channel) from the SGW via the S1 interface, and the TNL processing and the PHY processing in the eNB perform transport processing of the logical channels, so as to transmit to the UE after mapping the logical channels to physical channels (PDSCH, PUSCH). The PHY processing and the MAC processing in the UE convert the physical channels (PDSCH, PUSCH) to the logical channels (DCCH, DTCH).

In the LTE system, when the UE switches over a radio link from the eNB#1 to the eNB#2, handover (HO) processing is carried out. When the eNB#1 and the UE are performing radio communication, at the UE, if the radio reception level from the eNB#2 becomes stronger than the radio reception level from the eNB#1, the UE switches over the radio link from the eNB#1 to the eNB#2. In the HO processing for the radio link switchover, control information necessary for the HO processing and data having been buffered in the eNB#1 are transferred to the eNB#2, via the X2 interface.

The eNB#2 performs connection control and synchronization control with the UE, and on establishing a radio link, transmits data received from the eNB#1 via the X2 interface to the UE. The synchronization control includes a random access sequence performed between the eNB#2 and the UE (calling control from the UE to the eNB#2), time alignment processing between the eNB#2 and the UE, and uplink/downlink resource allocation processing between the eNB#2 and the UE. The time alignment processing is time synchronization processing for succeeding the UE radio communication, performed between with the eNB#1, to the eNB#2. The resource allocation processing includes resource allocation and an access sequence for user data transmission.

On completion of the above-mentioned series of handover processing, path switchover control is made so as to send a data from the SGW, destined to the eNB#1, to the eNB#2. At this time, both data transfer from the eNB#1 to the eNB#2 performed via the X2 interface and the synchronization control in the eNB#2 are performed under reference timing (SFN: System Frame Number).

Figure 11:
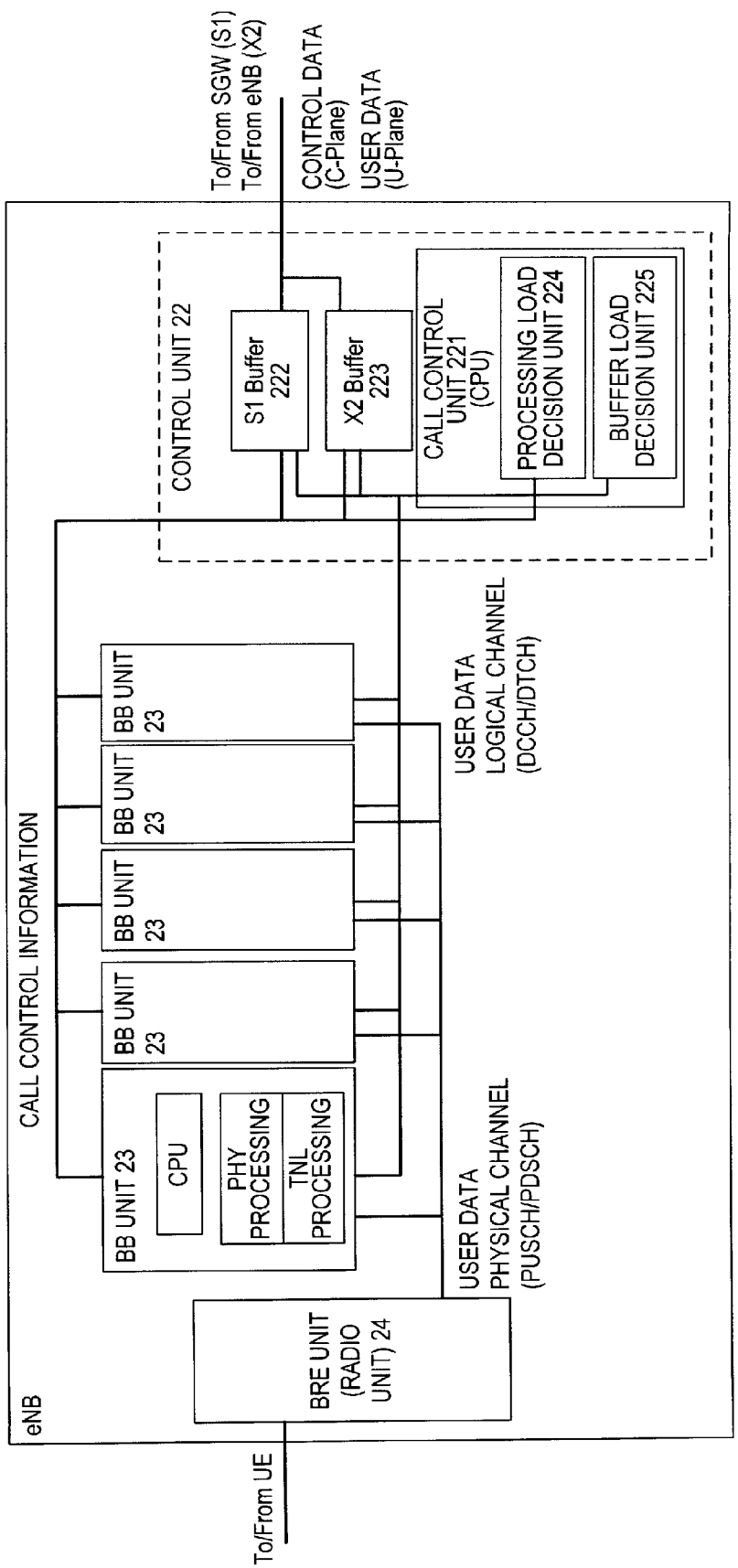
FIG. 11 is a diagram illustrating an exemplary configuration of the radio base station apparatus (eNB) of the LTE system, according to the present embodiment.

FIG. 11 is a diagram illustrating an exemplary configuration of the radio base station apparatus (eNB) of the LTE system, according to the present embodiment. The eNB includes a control unit 22, and in addition thereto, a plurality of baseband (BB) units 23 for processing physical channels according to call control by control unit 22, and a radio unit 24 for radio communication with mobile terminals. Control unit 22 in the eNB includes a call control unit 221 for managing call control information, an S1 buffer 222 for buffering data via a communication interface (S1) with the upper-level apparatus SGW, and an X2 buffer 223 for buffering data via a communication interface (X2) with other eNBs. Call control unit 221 includes a processing load decision unit 224 and a buffer load decision unit 225. BB unit 23 includes a TNL processing unit and a PHY processing unit illustrated in FIG. 10, and each of call control unit 22 and BB unit 23 includes a CPU (Central Processing Unit), and various kinds of processing are performed by the execution of processing programs in the CPU.

In the exemplary configuration illustrated in FIG. 11, processing load decision unit 224 or buffer load decision unit 25 perform decision of HO processing delay. Also, control unit 22 in the eNB#2 decides whether the HO processing be completed within a certain time, and if it is decided the HO processing to be not completed within the certain time, control unit 22 sends an HO timing change request to the eNB#1, so as to delay the start of the HO processing.

Hereafter, a handover processing sequence in the LTE system, having the eNB illustrated in the exemplary configuration of FIG. 11, will be described. For the sake of description of the present embodiment, in FIG. 12, an HO processing sequence when delay is not produced in the HO processing is illustrated, while in FIG. 13, a processing sequence when delay is produced in the HO processing is illustrated. Further, in FIG. 14, when delay is produced in the HO processing, a processing sequence for requesting for HO timing change according to the present embodiment is illustrated.

Figure 12:
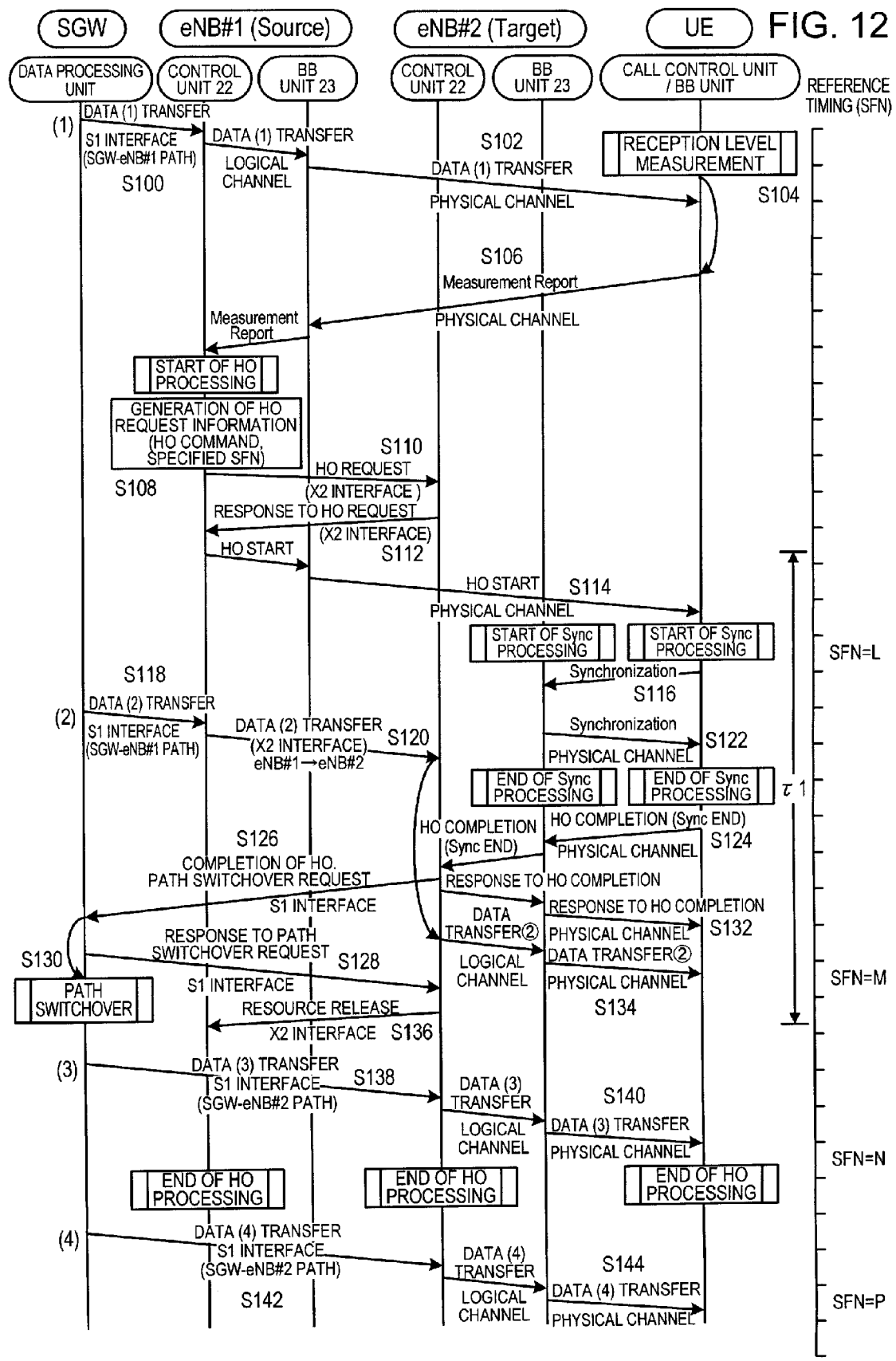
FIG. 12 illustrates the HO processing sequence when delay is not produced in the HO processing in the LTE system.

FIG. 12 illustrates the HO processing sequence when delay is not produced in the HO processing. The UE already establishes a radio link between with the eNB#1. The SGW transmits a data (1) destined to the UE, to the eNB#1 via the S1 interface (S100). Control unit 22 in the eNB#1 receives the data (1), and the data (1) is transferred from BB unit 23 to the UE (S102). The UE measures radio wave reception levels from the eNB#1 and the eNB#2 (S104), and sends a measurement report indicating measurement results to the eNB#1 (S106).

When control unit 22 in the eNB#1 receives the measurement results indicating that the radio wave reception level from the eNB#2 is higher than the radio wave reception level from the eNB#1, control unit 22 starts handover (HO) processing to switch the UE radio link from the eNB#1 to the eNB#2.

Control unit 22 in the eNB#1 generates HO request information including an HO command and a specified SFN (S108), so as to send it to control unit 22 of the eNB#2, via the X2 interface (S110). Control unit 22 in the eNB#2 returns a response to the HO request information (S112). On receiving the above response, control unit 22 in the eNB#1 transmits HO start information to the UE (S114). The HO start information includes an HO command and a specified SFN, similar to the HO request information.

When the UE receives the HO start information, the UE transmits a synchronization message (start) to BB unit 23 in the eNB#2 (S116), and starts the synchronization control processing. Also, when BB unit 23 in the eNB#2 receives a synchronization message (start), BB unit 23 starts synchronization control processing.

After control unit 22 in the eNB#1 transmits the HO start information to the UE, when control unit 22 in the eNB#1 receives from the SGW a data (2) destined to the UE (S118), control unit 22 in the eNB#1 transfers the data (2) to the eNB#2 via the X2 interface (S120). At this time, the eNB#2 and the UE are performing the synchronization control processing, and therefore, the eNB#2 waits for the transmission of the data (2) until the synchronization control is completed, and buffers the data (2) into X2 buffer 223.

On completion of the synchronization control processing, BB unit 23 in the eNB#2 transmits a synchronization message (completion) to the UE (S122). When the UE completes the self-synchronization control processing and receives the synchronization message (completion) from the eNB#2, the UE sends HO completion information to the eNB#2 (S124).

On receiving the HO completion information from the UE, control unit 22 in the eNB#2 transmits a path switchover request to the SGW together with the HO completion information, via the S1 interface (S126). The SGW returns to the eNB#2 a response to the path switchover request (S128), and also executes a path switchover (S130).

Further, after receiving the HO completion information, control unit 22 in the eNB#2 returns its response to the UE (S132), and also transmits the data (2), of which transmission has been awaited, to the UE (S134). On receiving the response to the path switchover request, control unit 22 in the eNB#2 sends a path switchover completion (resource release) notification to the eNB#1 (S136).

On completion of the path switchover to the eNB#2, the SGW transmits a data (3), destined to the UE, to the eNB#2 via the S1 interface (S138), and the eNB#2 transmits the data (3) to the UE (S140). As such, the handover processing to switch over the radio link from the eNB#1 to the eNB#2 is completed. A subsequent data (4) is also transmitted from the SGW to the eNB#2 via the S1 interface (S142), and then the eNB#2 transmits the data (4) to the UE (S144).

However, as in the case of the BTS of the W-CDMA system, if the processing is congested in control unit 22 or BB unit 23, delay may occur in the HO processing. The HO processing delay in the LTE system causes a long HO processing time, and as an example according to the present embodiment, a time from the start of HO (S110) to the release of resources (S136) is set to be a criterion of the HO processing time. In FIG. 12, the HO processing time is expressed by τ1. The HO processing delay may be caused by the delay of the synchronization control processing in BB unit 23, transfer processing delay in the buffer of control unit 22, and so on.

When a load condition of BB unit 23 in the eNB#2 is high, causing delay in synchronization control with the UE, a path switchover of eNB#1→eNB#2 is delayed. By this, a data transfer amount of eNB#1→eNB#2 via the X2 interface becomes large. In the event that the data transfer amount exceeds the buffer amount of X2 buffer 223, a missing data is produced. Also, there may be cases that, because of an overlap of the processing of S1 buffer 222 with the processing of X2 buffer 223, a transfer processing amount overflows, and a missing data is produced. This brings about quality deterioration in VoIP (Voice over IP), in which a real time characteristic is required, as well as missing data in packet data services, missing images in video services, and so on.

Figure 13:
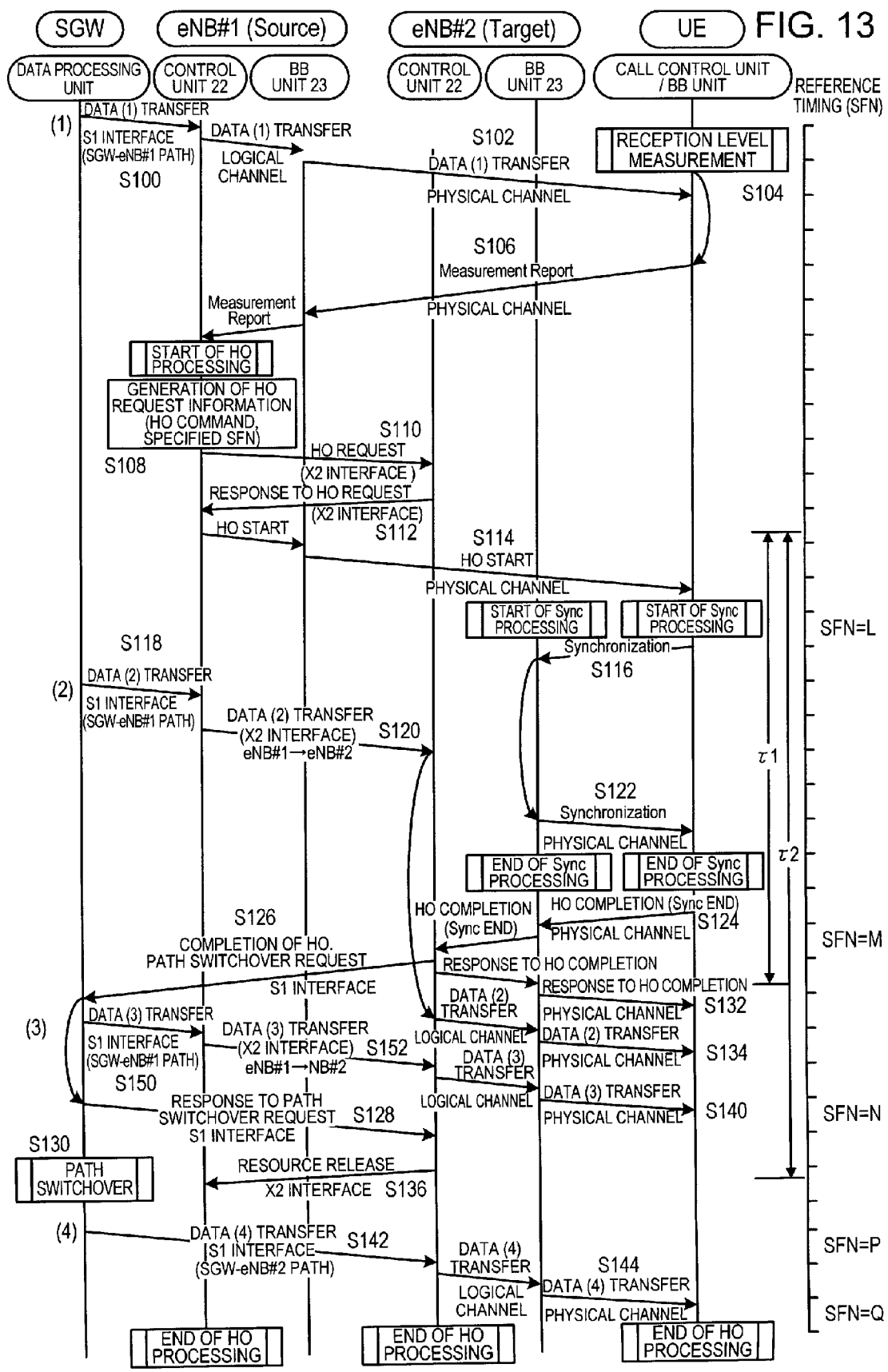
FIG. 13 illustrates a processing sequence illustrating an exemplary case that the HO processing is delayed in the LTE system.

FIG. 13 illustrates a processing sequence illustrating an exemplary case that the HO processing is delayed in the LTE system. In the processing sequence illustrated in FIG. 13, as compared to the processing sequence illustrated in FIG. 12, BB unit 23 in the eNB#2 encounters congestion, and thereby along synchronization control processing time is produced. The HO processing time becomes τ2, which is longer than τ1, and at the time of the transmission of data (3) from the SGW, path switchover at the SGW is not carried out. In this case, the data (3) is transmitted to the eNB#1 (S150), and transferred to the eNB#2 through the X2 interface (S152). As such, when the HO processing is delayed, the data amount awaited for transmission becomes large, and if it exceeds the buffer amount of X2 buffer 223, a missing data may occur.

Figure 14:
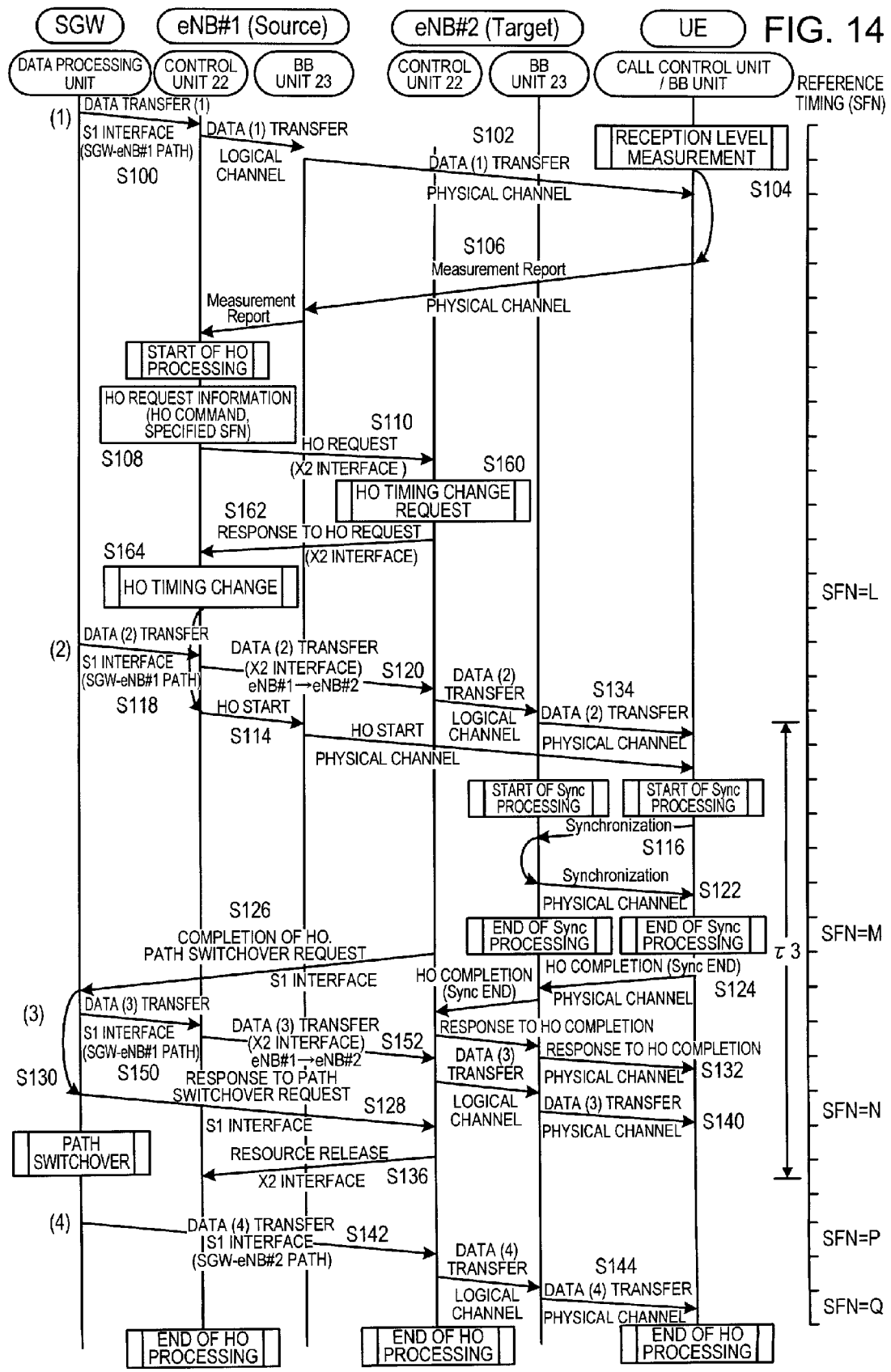
FIG. 14 illustrates a processing sequence for requesting to change the HO timing according to the present embodiment, when delay may occur in the HO processing.

FIG. 14 illustrates a processing sequence for requesting to change the HO timing according to the present embodiment, when delay may occur in the HO processing. When the eNB#2 receives HO request information from the eNB#1 (S110), processing load decision unit 224 in the eNB#2 performs HO processing delay decision (S160). By means of the aforementioned equations (A), (B), processing load decision unit 224 decides whether the number of processing channels or the processing channel capacity is not smaller than a threshold C. In case of being no smaller than the threshold C, processing load decision unit 224 regards that the HO processing will not be completed within a certain time. As a response to the HO request, the eNB#2 transmits an HO timing change request to the eNB#1 (S160).

On receiving the HO timing change request, control unit 22 in the eNB#1 changes the HO timing (S164). More specifically, after receiving the HO timing change request, control unit 22 in the eNB#1 does not immediately send HO start information to the UE, and delays the transmission of the HO start information. After a lapse of time of a predetermined timer after the reception of the HO timing change request, the eNB#1 sends the HO start information to the UE (S114). The predetermined timer time may be set in a variable manner according to a degree that the calculated number of processing channels or the processing channel capacity exceeds the threshold C.

By the delay of the notification of the HO start information, the data (2) destined to the UE is transmitted to the UE before the start of the HO processing, without waited for transmission (S118, S120, S134). Also, because after the eNB#1 transfers to the eNB#2 the data (2) destined to the UE, and at the timing that delay is not produced in the HO processing, the eNB#1 is notified of the HO start information, the HO processing time is not elongated, and no delay is produced in the HO processing. An HO processing time τ3 illustrated in FIG. 14 is identical to the HO processing time τ1 in a normal operation. Accordingly, because of an elongated transmission waiting time of the data destined to the UE, neither the X1 buffer nor the S1 buffer will overflow.

In place of processing load decision unit 224, it may also be possible that a buffer load decision unit 225 makes the decision of HO processing delay, based on the buffer use rates of S1 buffer 222 and X2 buffer 223. Each buffer use rate is defined by the following equation (E).

$$\text{Buffer use rate} = \quad (E)$$
$$\text{(buffer amount presently in use)/(maximum buffer amount)} =$$
$$\text{(present data transfer amount)/(maximum data transfer amount)}$$

Because the transfer amount is a data transfer amount via the buffer, and the above buffer amount and the transfer amount have correlation with each other, the buffer use rate may be defined with the buffer amount or the data transfer amount. The buffer amount and the transfer amount may be one of the values in regard to the S1 buffer and the X2 buffer, or the sum of the both may be used.

Figure 15:
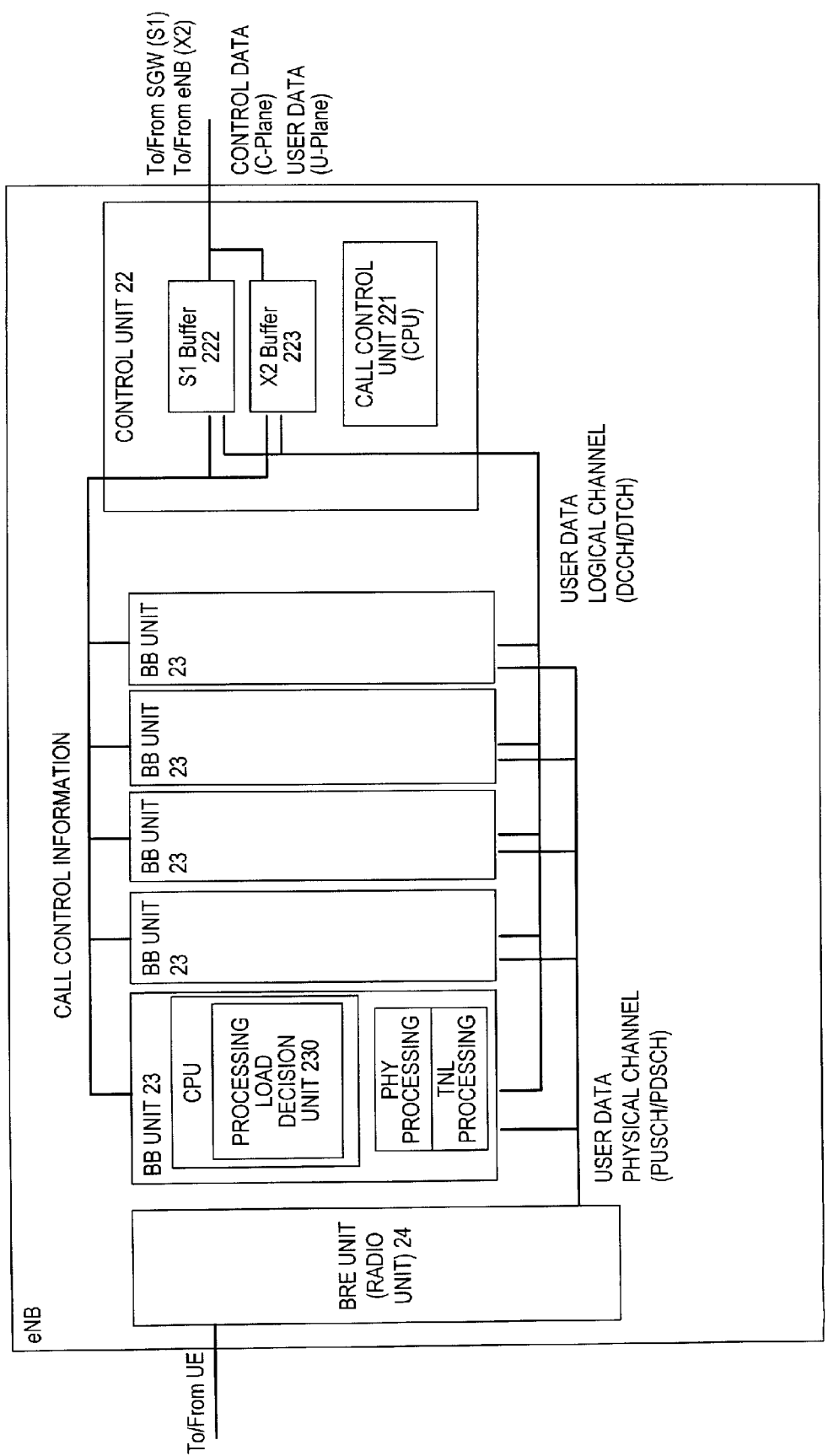
FIG. 15 is a diagram illustrating another exemplary configuration of the radio base station apparatus (eNB) of the LTE system, according to the present embodiment.

FIG. 15 is a diagram illustrating another exemplary configuration of the radio base station apparatus (eNB) of the LTE system, according to the present embodiment.

Each baseband (BB) unit 23 of the eNB includes a processing load decision unit 230 in the exemplary diagram of FIG. 15. In the example of FIG. 15, each buffer load decision unit 230 of the baseband (BB) unit 23 decides the delay of the HO processing, and judges whether the number of channel and the number of processing channels are equal to or over the threshold in each BB unit, according to the equations (C) and (D) describe above. When they is equal to or over the threshold, the HO timing change request is transmitted to the eNB#1 (the step S160 of FIG. 13).

As such, in the LTE system, by changing the HO processing timing, buffer overflow caused by the delay (long time) of the HO processing is prevented, and also the increase of data awaited for transmission is prevented. By this, the occurrence of quality deterioration such as missing data and voice interruption can be suppressed.

By delaying the start timing of hard handover processing even in case of a large load of radio base station apparatus that performs the hard handover processing, it is possible to prevent missing data and the deterioration of communication quality by making coincident the processing timing between the radio base station apparatus and the mobile terminal apparatus.

A mobile communication system performing handover processing to allow a mobile terminal to switch a communication target from first radio base station apparatus to second radio base station apparatus, comprises: a first radio base station apparatus under radio communication with the mobile terminal; and a second radio base station apparatus radio-communicating with the mobile terminal, taking place of the first radio base station apparatus, by means of handover processing, wherein the first radio base station apparatus transmits handover processing start timing to the second radio base station apparatus, and the second radio base station apparatus decides a possibility of handover processing delay according to the handover processing start timing, and transmits a start timing change request of handover processing to the first radio base station apparatus on deciding there is a possibility of delay, and the first radio base station apparatus transmits to the mobile terminal a handover processing start signal to start the handover processing at timing later than the handover processing start timing according to the start timing change request from the second radio base station apparatus, so that the handover processing is performed between the mobile terminal and the second radio base station apparatus.

Each of the first radio base station apparatus and the second radio base station apparatus described above may comprises: a baseband processing unit accommodating a plurality of channels and performing baseband processing including handover processing for each channel; and a decision unit deciding the possibility of delay based on the number of processing channels or a processing channel capacity in the baseband processing unit.

Each of the first radio base station apparatus and the second radio base station apparatus described above may comprises: a plurality of baseband processing units each accommodating a plurality of channels and performing baseband processing including handover processing for each channel; and a decision unit deciding the possibility of delay based on the number of processing channels or a processing channel capacity in a baseband unit accommodating a channel requested to perform handover among the plurality of baseband units.

Each of the first radio base station apparatus and the second radio base station apparatus described above may comprises: a buffer for temporarily storing the reception data during a period before reception data transfer; and a decision unit deciding the possibility of delay based on the buffer use rate.

A radio base station apparatus of handover target, communicating with a mobile terminal by handover processing, comprises: a call control unit receiving handover processing start timing from radio base station apparatus of handover source; a decision unit deciding a possibility of handover processing delay according to the handover start timing; and a baseband processing unit accommodating a plurality of channels and performing baseband processing including handover processing for each channel, and starting the handover processing at timing later than the handover processing start timing, wherein, when the decision unit decides there is a possibility of delay, the call control unit transmits a start timing change request of handover processing to the radio base station apparatus of handover source.

The decision unit decides the possibility of delay based on the number of processing channels or a processing channel capacity in the baseband processing unit.

A plurality sets of baseband processing are provided, and the decision unit decides the possibility of delay based on the number of processing channels or a processing channel capacity in a baseband unit accommodating a channel requested to perform hard handover among the plurality of baseband processing units.

The radio base station apparatus described above further comprises: during a period before reception data transfer, a buffer for temporarily storing the reception data, wherein the decision unit decides the possibility of delay based on the buffer use rate.

There is provided a handover processing method for switching a communication target of a mobile terminal from a first radio base station apparatus to a second radio base station apparatus, wherein the first radio base station apparatus transmits handover processing start timing to the second radio base station apparatus, the second radio base station apparatus decides a possibility of handover processing delay according to the handover start timing, and on deciding there is a possibility of delay, transmits a start timing change request of handover processing to the first radio base station apparatus, and the first radio base station apparatus transmits to the mobile terminal a handover processing start signal to allow handover processing to start at timing later than the handover processing start timing according to the start timing change request from the second radio base station apparatus, so that the handover processing is performed between the mobile terminal and the second radio base station apparatus.

The technical features of the embodiments described above are described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A mobile communication system comprising:
    a radio base station apparatus performing hard handover processing in synchronization with a mobile terminal under radio communication therewith; and
    a control apparatus transmitting a first hard handover processing start timing to the radio base station apparatus, wherein the radio base station apparatus calculates, based on a processing load status of the radio base station apparatus, a possibility of delay in performing the hard handover processing at the first hard handover processing start timing, and when there is a possibility of delay, performs the hard handover processing at a second hard handover processing start timing later than the first hard handover processing start timing,
    wherein the radio base station apparatus transmits a start timing change request of the hard handover processing to the control apparatus on calculating there is a possibility of delay, and the control apparatus transmits the second hard handover processing start timing to the radio base station apparatus according to the start timing change request from the radio base station apparatus.

2. The mobile communication system according to claim 1, wherein the radio base station apparatus comprises:
    a baseband processing unit configured to accommodate a plurality of channels and performing baseband processing including the hard handover processing for each channel; and
    a decision unit configured to calculate the possibility of delay based on a number of processing channels or a processing channel capacity in the baseband processing unit.

3. The mobile communication system according to claim 1, wherein the radio base station apparatus comprises:
    a plurality of baseband processing units each configured to accommodate a plurality of channels and performing baseband processing including the hard handover processing for each channel; and
    a decision unit configured to calculate the possibility of delay based on a number of processing channels or a processing channel capacity in a baseband unit accommodating a channel requested to perform a hard handover among the plurality of baseband processing units.

4. A radio base station apparatus performing hard handover processing in synchronization with a mobile terminal under radio communication therewith, comprising:
    a call control unit configured to receive first hard handover processing start timing from an upper-level apparatus;
    a decision unit configured to calculate, based on a processing load status of the radio base station apparatus, a possibility of a delay in performing the hard handover processing at the first hard handover start timing; and
    a baseband processing unit configured to accommodate a plurality of channels and performing baseband processing including the hard handover processing for each channel, and configured to perform the hard handover processing at a second hard handover processing start timing later than the first hard handover processing start timing when the decision unit calculates there is a possibility of delay,
    wherein, when the decision unit calculates there is a possibility of delay, the call control unit transmits a start timing change request of the hard handover processing to the upper-level apparatus, and thereafter receives the second hard handover processing start timing from the upper-level apparatus.

5. The radio base station apparatus according to claim 4, wherein the decision unit calculates the possibility of delay based on a number of processing channels or a processing channel capacity in the baseband processing unit.

6. The radio base station apparatus according to claim 4, further comprising:
    a plurality of baseband processing units, wherein the decision unit calculates the possibility of delay based on a number of processing channels or a processing channel capacity in a baseband processing unit accommodating a channel requested to perform a hard handover among the plurality of baseband processing units.

7. A hard handover processing method for a radio base station apparatus under radio communication with a mobile terminal, comprising:
- receiving a first hard handover processing start timing from an upper-level apparatus;
- calculating, based on a processing load status of the radio base station apparatus, a possibility of delay in performing the hard handover processing at the first hard handover processing start timing; and
- performing the hard handover processing at a second hard handover processing start timing later than the first hard handover processing start timing when there is a possibility of delay,
- wherein, when there is a possibility of delay, transmitting from the base station a start timing change request of the hard handover processing to the upper-level apparatus, and receiving, at the base station, the second hard handover processing start tithing from the upper-level apparatus.

* * * * *